United States Patent
Kito et al.

(10) Patent No.: US 9,034,939 B2
(45) Date of Patent: May 19, 2015

(54) PRIMER FOR INK-JET RECORDING

(75) Inventors: Katsuyuki Kito, Ibaraki (JP); Masaru Nakayama, Ibaraki (JP); Seigi Kawarai, Ashiya (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 13/995,073

(22) PCT Filed: Dec. 16, 2011

(86) PCT No.: PCT/JP2011/079225
§ 371 (c)(1),
(2), (4) Date: Jun. 17, 2013

(87) PCT Pub. No.: WO2012/081703
PCT Pub. Date: Jun. 21, 2012

(65) Prior Publication Data
US 2013/0267627 A1   Oct. 10, 2013

(30) Foreign Application Priority Data

Dec. 17, 2010   (JP) .................................. 2010-281184
Dec. 17, 2010   (JP) .................................. 2010-281217

(51) Int. Cl.
| | |
|---|---|
| C08F 2/46 | (2006.01) |
| C08G 61/04 | (2006.01) |
| C09D 11/30 | (2014.01) |
| C09D 11/101 | (2014.01) |
| C09D 11/54 | (2014.01) |

(52) U.S. Cl.
CPC ............. *C09D 11/30* (2013.01); *C09D 11/101* (2013.01); *C09D 11/54* (2013.01)

(58) Field of Classification Search
CPC ....... C09D 11/101; C09D 11/30; C09D 11/54
USPC .......................................... 522/168, 1; 520/1
See application file for complete search history.

(56) References Cited

U.S. PATENT DOCUMENTS

| | | | | |
|---|---|---|---|---|
| 8,124,194 | B2 * | 2/2012 | Nakamura et al. ............ | 427/508 |
| 8,299,142 | B2 * | 10/2012 | Yokoi ............................ | 523/160 |
| 2009/0041991 | A1 * | 2/2009 | Takano et al. ................ | 428/195.1 |
| 2009/0087627 | A1 | 4/2009 | Watanabe et al. | |

FOREIGN PATENT DOCUMENTS

| | | |
|---|---|---|
| EP | 2042574 A1 | 4/2009 |
| EP | 2233538 A1 | 9/2010 |
| JP | 2003-531223 A | 10/2003 |
| JP | 2005-96254 A | 4/2005 |
| JP | 2008-007687 A | 1/2008 |
| JP | 2009-067860 A | 4/2009 |
| JP | 2009-83267 A | 4/2009 |
| JP | 2009-084313 A | 4/2009 |
| JP | 2009-084424 A | 4/2009 |
| JP | 2010-017899 A | 1/2010 |
| JP | 2011-190342 A | 9/2011 |
| WO | WO 00/31189 A1 | 6/2000 |

OTHER PUBLICATIONS

International Search Report issued in PCT/JP2011/079225, mailed on Jan. 31, 2012.
English translation of JP-2008-7687-A, published Jan. 17, 2008.
English translation of JP-2009-67860-A, published Apr. 2, 2009.
English translation of JP-2009-84313-A, published Apr. 23, 2009.
English translation of JP-2010-17899-A, published Jan. 28, 2010.
English translation of JP-2011-190342-A, published Sep. 29, 2011.
International Preliminary Report on Patentability and Written Opinion of the International Searching Authority (Forms PCT/IB/338, PCT/IB/373 and PCT/ISA/237) for International Application No. PCT/JP2011/079225, mailed Jun. 27, 2013 with English translation.
Extended European Search Report dated Aug. 25, 2014, for European Application No. 11849484.8.

* cited by examiner

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

The present invention relates to a primer ink comprising a polymerizable compound and a polymerization initiator, wherein the polymerizable compound comprises a monofunctional monomer having an aromatic hydrocarbon-based ring structure in a molecule and an aliphatic hydrocarbon-based monofunctional monomer, wherein a total mass of the monofunctional monomer having an aromatic hydrocarbon-based ring structure in a molecule and an aliphatic hydrocarbon-based monofunctional monomer is 80% by mass or more based on the total mass of all polymerizable compounds which the primer ink comprises, and wherein a surface tension of is 25 mN/m to 31 mN/m and a viscosity is 50 mPa·s or less.

11 Claims, No Drawings

PRIMER FOR INK-JET RECORDING

TECHNICAL FIELD

The present invention relates to a primer for ink-jet ink, in particular, a primer ink for ink-jet recording which is applied by an ink-jet printing system.

BACKGROUND ART

An ink-jet system which ejects inks in liquid droplets from an ink emitting port is employed in many printers for the reason that it is compact and inexpensive and it is capable of forming an image without contacting a recording medium.

In recent years, ink-jet printers have not been limited only to photographic printing and document printing for home use or office use, and the development of commercial printing equipment and industrial printing equipment employing ink-jet printers has been carried out in advertising, poster, or ornamental utilization. According to this situation, it is strongly demanded for conventional ink-jet inks and ink-jet recording printed products for home use or office use to have (1) high quality in a formed image and (2) an ability to carry out printing on various recording media including non-absorbable recording media such as plastic media so as to be capable of being used as ink-jet inks and ink-jet recording print products suitable to commercial printing or industrial printing.

Conventionally, ink-jet inks, recording devices and methods used in printing for home use or office use (hereinafter abbreviated as ink-jet ink and the like including ink, device and method) have often been developed for the purpose of printing photographs or documents. For this reason, when recording is carried out on a non-absorbable recording medium by use of conventional ink-jet ink and the like, if it takes a long time for drying of the ejected liquid droplets or permeation thereof into the recording medium, there are the problems that the image is easily blurred, and the mixing of adjacent ink liquid droplets occurs on the recording medium, thereby preventing a sharp image from being formed. Moreover, when an image is formed on a non-absorbable recording medium, there are the practical problem that the fixation properties of the image are not good, that is, it is easily peeled off from the recording media, the abrasion properties are poor, and the like. Also, when applied to high-speed printing, liquid droplets are displaced from the positions at which they landed, because the adjacent liquid droplets coalesce after ejection and move, thus causing the problems that color unevenness and the like are generated due to droplet-interference, that is, a line width is non-uniform when drawing fine lines and color unevenness and the like are generated when drawing a color surface.

In this specification, hereinafter, the properties such as abrasion properties and easiness of peeling will be referred to as "fixation properties" and the properties concerning image qualities such as color unevenness and non-uniformity of line width will be referred to as "drawing properties".

As means for solving the above problems, various technologies have been proposed so far, which include, for example, technologies for improving the components and constitution of ink itself (for example, Patent Document 1) and technologies for improving an ink-jet recording device or method (for example, Patent Document 2). However, the technologies disclosed in the above documents have failed to sufficiently solve the problems concerning the fixation properties of an image recorded in a non-absorbable recording medium, which problems are considered to be important in particular commercial or industrial print products. Patent Document 3, on the other hand, discloses that a primer is adopted, and the primer is to semicured to perform single pass printing in a recording method in order to solve the fixation property problem. Patent Document 3 also describes or suggests ink or primer components, preferable physical properties of these compounds, and a relationship between the both. This is intended to solve the fixation property problem from an overall point of view.

PRIOR ART DOCUMENTS

Patent Documents

Patent Document 1: JP 2003-531223 T
Patent Document 2: JP 2005-096254 A
Patent Document 3: JP 2009-083267 A

DISCLOSURE OF THE INVENTION

Problems to be Solved by the Invention

However, when a primer is formed on a non-absorbable recording medium (for example, an acrylic sheet) other than PET, which is not used in Patent Document 3, by using a compound described in Patent Document 3 and an image is formed on the primer, the image is immediately peeled off only by light abrasion with a nail and this does not proceed to a stage for evaluating the drawing properties. That is, the fixation properties and drawing properties of an image formed on a non-absorbable recording medium are still unsatisfactory.

Therefore, an object of the present invention is to provide a primer ink which can improve the fixation properties of an image formed on various non-absorbable recording media by using an ink-jet ink, can also attain a high-quality image, and is itself applied onto the recording media by ink-jet systems.

Means for Solving the Problem

The application (undercoating) of a primer is effective to improve the fixation properties of an image when the image is formed on a non-absorbable recording medium by using an ink-jet ink, and substances used for the primer have been taken up in many documents so far. However, substances which can be used for a primer are only generally described in conventional documents as typified by Patent Document 3, and there is no idea for applying a primer itself by ink-jet systems. Moreover, when functionally classified, substances constituting a primer need to be constituted so as to satisfy all of the following requirements of: (1) securing adhesion to a recording medium, (2) having affinity to a printed image created by an image forming ink, and (3) having coating curability.

The inventors of the present invention have found that a primer ink containing a monofunctional monomer having a specified structure in a specified ratio can improve the fixation properties and drawing properties of an image when the image is formed on various non-absorbable recording media by using an ink-jet ink, and completed the present invention.

The subject matters of the present invention and the preferred embodiments thereof are as follows.

[1] A primer ink comprising a polymerizable compound and a polymerization initiator, wherein the polymerizable compound comprises a monofunctional monomer having an aromatic hydrocarbon-based ring structure in a molecule and an aliphatic hydrocarbon-based monofunctional monomer, wherein a total mass of the monofunctional monomer having an aromatic hydrocarbon-based ring structure in a molecule and the aliphatic hydrocarbon-based monofunctional monomer is 80% by mass or more based on the total mass of all polymerizable compounds which said primer ink comprises, and wherein a surface tension is 25 mN/m to 31 mN/m and a viscosity is 50 mPa·s or less.

[2] The primer ink according to the above item [1], wherein the monofunctional monomer having an aromatic hydrocarbon-based ring structure comprises 2-hydroxy-3-phenoxypropyl acrylate.

[3] The primer ink according to the above item [1] or [2], wherein the aliphatic hydrocarbon-based monofunctional monomer comprises a monofunctional monomer not having an alicyclic hydrocarbon structure in a molecule.

[4] The primer ink according to any one of the above items [1] to [3], wherein the aliphatic hydrocarbon-based monofunctional monomer comprises a monofunctional monomer having an alicyclic hydrocarbon structure in a molecule.

[5] The primer ink according to any one of the above items [1] to [4], further comprising an anti-gelling agent and a surface modifier.

[6] The primer ink according to any one of the above items [1] to [5] for using as a primer for an image forming ink composition having a surface tension of 25 mN/m to 32 mN/m.

Effect of the Invention

According to the present invention, a printed product prepared by ink-jet system, which has excellent fixation properties against a non-absorbable recording medium and high-quality image, can be provided.

MODE FOR CARRYING OUT THE INVENTION

Hereinafter, the present invention will be described in detail.

The primer ink of the present invention comprises a polymerizable compound.

Specifically, examples thereof include an addition-polymerizable compound having at least one ethylenic unsaturated double bond, a polymer compound having a maleimide group at a side chain, and a polymer compound having, at a side chain, a cinnamyl group, a cinnamylidene group, a chalcone group or the like which has a photodimerizable unsaturated double bond adjacent to an aromatic nucleus. Among them, a radically polymerizable compound which is polymerized by an active radical generated from the polymerization initiator is preferable, an addition-polymerizable compound having at least one ethylenic unsaturated double bond is more preferable, and a compound selected from compounds having at least one terminal ethylenic unsaturated double bond is particularly preferable. Examples thereof include (meth)acrylates, (meth)acrylamides, aromatic vinyl compounds, vinyl ethers and compounds having an internal double bond (e.g., maleic acid). The chemical forms of these compounds may be monomers, prepolymers (i.e., dimers, trimmers and oligomers), copolymers thereof or a mixture thereof.

<Radically Polymerizable Compound>

The primer ink of the present invention comprises a monofunctional monomer having an aromatic hydrocarbon-based ring structure in a molecule and an aliphatic hydrocarbon-based monofunctional monomer as the polymerizable compound. It is possible to secure the excellent fixation properties of an image on a variety of non-absorbable recording media by adding at least two aforementioned monofunctional monomers.

In the present invention, "monofunctional monomer having an aromatic hydrocarbon-based ring structure in a molecule" (hereinafter, sometimes referred to as "monofunctional monomer having an aromatic ring structure") refers to a polymerizable monomer which has one ethylenic double bond and one or more ring structures of aromatic hydrocarbon in a molecule and is polymerized by an initiating species such as an active radical.

Examples of such a monofunctional monomer having an aromatic ring structure include (meth)acrylates having one or more ring structures of aromatic hydrocarbon, such as 2-hydroxy-3-phenoxypropyl(meth)acrylate (2-HPA), phenoxymethyl(meth)acrylate, phenoxyethyl(meth)acrylate, alkoxy-modified phenol(meth)acrylate, EO-modified nonylphenol(meth)acrylate, PO-modified nonylphenol(meth)acrylate, alkoxy-modified nonylphenol(meth)acrylate, benzyl(meth)acrylate, 2-(meth)acryloyloxyethyl phthalate, 2-(meth)acryloyloxyethyl-2-hydroxyethyl phthalate, 4-butylphenyl(meth)acrylate, phenyl(meth)acrylate, 2,4,5-tetramethyl-phenyl (meth)acrylate, 4-chlorophenyl(meth)acrylate and EO-modified cresol(meth)acrylate. In addition, for example, aromatic vinyl compounds such as styrene, methylstyrene, dimethylstyrene, trimethylstyrene, ethylstyrene, isopropylstyrene, chloromethylstyrene, methoxystyrene, acetoxystyrene, chlorostyrene, dichloro styrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene; and vinyl ethers having one or more ring structures of aromatic hydrocarbon in a molecule, such as benzyl vinyl ether, phenylethyl vinyl ether and phenoxypolyethylene glycol vinyl ether may be used. These compounds may be used alone or as a mixture of two or more kinds thereof. In particular, it is preferable to use (meth)acrylates. In particular, the primer ink of the present invention preferably comprises 2-hydroxy-3-phenoxypropyl(meth)acrylate as the monofunctional monomer having an aromatic ring structure. Here, in the present specification, the term "(meth)acrylate" means both "acrylate" and "methacrylate", or one of them. The same thing applies to "(meth)acryloyloxy" and "(meth)acrylamide" explained later.

In the present invention, "aliphatic hydrocarbon-based monofunctional monomer" refers to a polymerizable monomer which has one ethylenic double bond and a linear, branched or cyclic hydrocarbon chain (or a hydrocarbon group) in a molecule and is polymerized by an initiating species such as radicals generated from the polymerization initiator.

In one embodiment of the present invention, the aliphatic hydrocarbon-based monofunctional monomer may be an acyclic hydrocarbon-based monofunctional monomer not having an alicyclic hydrocarbon structure (hereinafter, sometimes referred to as "acyclic hydrocarbon-based monofunctional monomer"). In the present invention, "acyclic hydrocarbon-based monofunctional monomer" refers to a monofunctional monomer which consists of a linear or branched hydrocarbon chain and a functional group having one ethylenic double bond and does not have any ring structure in a molecule. Examples of the functional group having one ethylenic double bond include a (meth)acryloyloxy group, a (meth)acrylamide group, a vinyl group and a vinyl ether group.

Examples of the acyclic hydrocarbon-based monofunctional monomer include (meth)acrylates such as butyl(meth)acrylate, isobutyl(meth)acrylate, amyl(meth)acrylate, isoamyl(meth)acrylate, hexyl(meth)acrylate, isohexyl(meth)acrylate, octyl(meth)acrylate, isooctyl(meth)acrylate, 2-ethylhexyl(meth)acrylate, tert-octyl(meth)acrylate, decyl(meth)acrylate, isodecyl(meth)acrylate, lauryl(meth)acrylate, myristyl(meth)acrylate, isomyristyl(meth)acrylate, stearyl (meth)acrylate and isostearyl(meth)acrylate. In addition, for example, (meth)acrylamides such as N-methyl(meth)acrylamide, N-ethyl(meth)acrylamide, N-propyl(meth)acrylamide, N-n-butyl(meth)acrylamide, N-t-butyl(meth)acrylamide, N-isopropyl(meth)acrylamide, N,N-dimethyl(meth)acrylamide and N,N-diethyl(meth)acrylamide; vinyl ethers such as methyl vinyl ether, ethyl vinyl ether, propyl vinyl ether, n-butyl vinyl ether, t-butyl vinyl ether, 2-ethylhexyl vinyl ether, n-nonyl vinyl ether and lauryl vinyl ether may be used. These compounds may be used alone or as a mixture of two or more kinds thereof. In particular, it is preferable to use, as the acyclic hydrocarbon-based monofunctional monomer, (meth)acrylates having a (meth)acryloyloxy group as the ethylenic double bond in a molecule.

In another embodiment of the present invention, the aliphatic hydrocarbon-based monofunctional monomer may be an alicyclic hydrocarbon-based monofunctional monomer having an alicyclic hydrocarbon structure (hereinafter, sometimes referred to as "alicyclic hydrocarbon-based monofunctional monomer"). In the present invention, "alicyclic hydrocarbon-based monofunctional monomer" refers to a monofunctional monomer which has an ethylenic double bond and at least one alicyclic hydrocarbon structure in a molecule.

Examples of the alicyclic hydrocarbon-based monofunctional monomer include (meth)acrylates having an alicyclic hydrocarbon structure in a molecule, such as cyclohexyl (meth)acrylate, 4-n-butylcyclohexyl(meth)acrylate, bornyl (meth)acrylate, isobornyl(meth)acrylate, 3,5,5-trimethylcyclohexyl acrylate, dicyclopentenyl acrylate, dicyclopentenyloxyethyl acrylate and dicyclopentanyl acrylate. In addition, vinyl ethers having an alicyclic hydrocarbon structure in a molecule, such as cyclohexyl vinyl ether, cyclohexyl methyl vinyl ether, 4-methyl cyclohexyl methyl vinyl ether and 4-hydroxymethyl cyclohexyl methyl vinyl ether may be used. These compounds may be used alone or as a mixture of two or more kinds thereof. In particular, it is preferable to use, as the alicyclic hydrocarbon-based monofunctional monomer, (meth)acrylates having a (meth)acryloyloxy group as the ethylenic double bond in a molecule. In particular, the primer ink of the present invention preferably comprises at least one compound selected from the group consisting of isobornyl acrylate, cyclohexyl acrylate, 3,5,5-trimethyl cyclohexyl acrylate, dicyclopentenyl acrylate, dicyclopentenyloxyethyl acrylate and dicyclopentanyl acrylate.

The aliphatic hydrocarbon-based monofunctional monomer which the primer ink of the present invention contains may be either an acyclic hydrocarbon-based monofunctional monomer or an alicyclic hydrocarbon-based monofunctional monomer. The aliphatic hydrocarbon-based monofunctional monomer may be both of acyclic hydrocarbon-based monofunctional monomer and alicyclic hydrocarbon-based monofunctional monomer.

In the primer ink of the present invention, a total mass of the monofunctional monomer having an aromatic ring structure and the aliphatic hydrocarbon-based monofunctional monomer is 80% by mass or more based on the total mass of all polymerizable compounds which the primer ink contains. The upper limit of the monofunctional monomers is not particularly limited. All (i.e., 100% by mass) of polymerizable compounds which the primer ink contains may consist of the monofunctional monomer having an aromatic ring structure and the aliphatic hydrocarbon-based monofunctional monomer.

Furthermore, the primer ink of the present invention preferably contains the monofunctional monomer having an aromatic ring structure and the aliphatic hydrocarbon-based monofunctional monomer in the weight ratio (monofunctional monomer having an aromatic ring structure:aliphatic hydrocarbon-based monofunctional monomer) of 8:2 to 2:8. By using these monomers in such a ratio, it is possible to impart the required surface tension and appropriate viscosity to the resulting ink primer.

The primer ink of the present invention can contain, in addition to the monofunctional monomer having an aromatic ring structure and the aliphatic hydrocarbon-based monofunctional monomer, a monofunctional monomer which is different from the aforementioned monomers in their structure, as the polymerizable compound. As such monomers, a known monofunctional monomer which is polymerizable or crosslinkable by an initiating species such as radicals generated from the polymerization initiator can be used.

Specifically, examples thereof include 2-ethylhexyl diglycol(meth)acrylate, butoxyethyl(meth)acrylate, 2-chloroethyl (meth)acrylate, 4-bromobutyl(meth)acrylate, cyanoethyl (meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl (meth)acrylate, 2-(2-butoxyethoxy)ethyl(meth)acrylate, 2,2,2-trifluoroethyl(meth)acrylate, 1H, 1H, 2H, 2H-perfluorodecyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, dimethylaminoethyl (meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethylene oxide monomethylether(meth)acrylate, oligoethylene oxide monomethylether(meth)acrylate, polyethylene oxide(meth)acrylate, oligoethylene oxide(meth)acrylate, oligoethylene oxide monoalkylether(meth)acrylate, polyethylene oxide monoalkylether(meth)acrylate, dipropyleneglycol(meth)acrylate, polypropylene oxide monoalkylether(meth)acrylate, oligopropylene oxide monoalkylether(meth)acrylate, 2-methacryloyloxyethyl succinate, butoxydiethyleneglycol (meth)acrylate, trifluoroethyl(meth)acrylate and perfluorooctylethyl(meth)acrylate. In addition, (meth)acrylamides, such as (meth)acrylamide, N-butoxymethyl(meth)acrylamide, N-methylol(meth)acrylamide and (meth)acryloyl morpholine; and vinyl ethers such as methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, diethylene glycol monovinyl ether, polyethylene glycol vinyl ether, chloroethyl vinyl ether, chlorobutyl vinyl ether and chloroethoxyethyl vinyl ether may be used.

Furthermore, in addition to the aforementioned compounds, for example, vinyl esters such as vinyl acetate, vinyl propionate and vinyl versatate; allyl esters such as allyl acetate; halogen-containing monomers such as vinylidene chloride and vinyl chloride; vinyl cyanide such as (meth) acrylonitrile; and olefins such as ethylene and propylene may be used.

These compounds may be used alone or as a mixture of two or more kinds thereof.

The primer ink of the present invention may contain a bifunctional or higher polyfunctional monomer, in addition to the aforementioned monofunctional monomer, as the polymerizable compound. The polyfunctional monomer may be a polymerizable monomer having two or more ethylenic double bonds in a molecule, which has an ability to be polymerized or crosslinked by radicals generated from the polymerization initiator. Examples thereof include bifunctional-, trifunctional-, tetrafunctional-, pentafunctional-, hexafunctional-(meth)acrylate compounds and polyfunctional vinyl ether compounds.

Specific examples of the bifunctional (meth)acrylate compounds include 1,6-hexanediol di(meth)acrylate, 1,10-decanediol di(meth)acrylate, neopentylglycol di(meth)acrylate, 2,4-dimethyl-1,5-pentanediol di(meth)acrylate, butylethylpropanediol(meth)acrylate, ethoxylated cyclohexanemethanol di(meth)acrylate, polyethyleneglycol di(meth)acrylate, oligoethyleneglycol di(meth)acrylate, ethyleneglycol di(meth)acrylate, 2-ethyl-2-butyl-butanediol di(meth)acrylate, hydroxypivalic acid neopentylglycol di(meth)acrylate, EO-modified bisphenol A di(meth)acrylate, bisphenol F polyethoxy di(meth)acrylate, polypropyleneglycol di(meth) acrylate, oligopropyleneglycol di(meth)acrylate, 1,4-butanediol di(meth)acrylate, 2-ethyl-2-butylpropanediol di(meth) acrylate, 1,9-nonane di(meth)acrylate, propoxylated-ethoxylated bisphenol A di(meth)acrylate and tricyclodecane di(meth)acrylate.

Specific examples of the trifunctional (meth)acrylate compounds include trimethylolpropane tri(meth)acrylate, trimethylolethane tri(meth)acrylate, alkyleneoxide modified tri(meth)acrylate of trimethylolpropane, pentaerythritol tri(meth)acrylate, dipentaerythritol tri(meth)acrylate, trimethylolpropane tris((meth)acryloyloxypropyl)ether, isocyanuric acid alkyleneoxide modified tri(meth)acrylate, propionic acid dipentaerythritol tri(meth)acrylate, tris((meth) acryloyloxyethyl)isocyanurate, hydroxypivalaldehyde modified dimethylolpropane tri(meth)acrylate, sorbitol tri(meth)acrylate, propoxylated trimethylolpropane tri(meth) acrylate and ethoxylated glycerol triacrylate.

Specific examples of the tetrafunctional (meth)acrylate compounds include pentaerythritol tetra(meth)acrylate, sorbitol tetra(meth)acrylate, ditrimethylolpropane tetra(meth) acrylate, propionic acid dipentaerythritol tetra(meth)acrylate and ethoxylated pentaerythritol tetra(meth)acrylate.

Specific examples of the pentafunctional (meth)acrylate compounds include sorbitol penta(meth)acrylate and dipentaerythritol penta(meth)acrylate.

Specific examples of the hexafunctional (meth)acrylate compounds include dipentaerythritol hexa(meth)acrylate, sorbitol hexa(meth)acrylate, alkyleneoxide modified hexa(meth)acrylate of phosphazene and caprolactone modified dipentaerythritol hexa(meth)acrylate.

Examples of the polyfunctional vinyl ether compounds include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkyleneoxide divinyl ether and bisphenol F alkyleneoxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adduct of trimethylolpropane trivinyl ether, propylene oxide adduct of trimethylolpropane trivinyl ether, ethylene oxide adduct of ditrimethylolpropane tetravinyl ether, propylene oxide adduct of ditrimethylolpropane tetravinyl ether, ethylene oxide adduct of pentaerythritol tetravinyl ether, propylene oxide adduct of pentaerythritol tetravinyl ether, ethylene oxide adduct of dipentaerythritol hexavinyl ether and propylene oxide adduct of dipentaerythritol hexavinyl ether. Among them, di- or trivinyl ether compounds are preferable as the vinyl ether compounds, from the viewpoints of curability, adhesion to a recording medium, and surface hardness of the obtained image. Divinyl ether compounds are particularly preferable.

It is preferable to use a relatively-large amount of monofunctional monomer as the polymerizable compound. The mixing ratio (ratio by mass) of monofunctional monomers to polyfunctional monomers (monofunctional monomers polyfunctional monomers) is preferably 10:0 to 8:2, and more preferably 10:0 to 9:1. When the mixing ratio of monofunctional monomers and polyfunctional monomers is within the above-mentioned range, a primer ink having excellent fixation properties, appropriate curing rate and viscosity can be obtained.

<Cationically Polymerizable Compound>

In addition, a cationically polymerizable compound can be used as the polymerizable compound. The cationically polymerizable compound is not particularly limited insofar as it is a compound of which a cationic polymerization reaction is initiated by applying some kind of energy and which has a function of curing a composition containing this compound. The cationically polymerizable compound may be in either form of monomer, oligomer or polymer. In particular, a cationically polymerizable compound known as a cationically photopolymerizable compound which is polymerized by an initiating species generated from the cationically polymerization initiator can be used. The cationically polymerizable compound may be a monofunctional compound or a polyfunctional compound.

Examples of the cationically polymerizable compound which may be used in the primer ink of the present invention include epoxy compounds, vinyl ether compounds and oxetane compounds disclosed in, for example, JP 6-9714 A, JP 2001-31892 A, JP 2001-40068 A, JP 2001-55507 A, JP 2001-310938 A, JP 2001-310937 A, JP 2001-220526 A and JP 2003-341217 A. The cationically polymerizable compound may be used alone or as a combination of two or more kinds thereof.

From the viewpoints of curability and abrasion resistance, as the cationically polymerizable compound which the primer ink of the present invention may have, an oxirane ring-containing compound or an oxetane ring-containing compound is preferable. It is more preferable to use both of an oxirane ring-containing compound and an oxetane ring-containing compound.

Here, in the specification, "oxirane ring-containing compound" (hereinafter, sometimes referred to as "oxirane compound") means a compound having at least one oxirane ring (e.g., oxiranyl group and epoxy group) in a molecule. Likewise, "oxetane ring-containing compound" (hereinafter, sometimes referred to as "oxetane compound") means a compound having at least one oxetane ring (or oxetanyl group) in a molecule.

The oxirane compound can be appropriately selected from the compounds which are commonly used as epoxy resins. For example, conventionally known aromatic epoxy resins, alicyclic epoxy resins or aliphatic epoxy resins can be used. These compounds may be in either form of monomer, oligomer or polymer.

Examples of the monofunctional epoxy compound include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxy methylcyclohexene oxide, 3-acryloyloxymethylcyclohexene oxide, and 3-vinylcyclohexene oxide.

Examples of the polyfunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl)-7,8-epoxy-1,3-dioxaspiro[5.5]undecane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methyl-cyclohexyl-3',4'-epoxy-6'-methylcyclohexane carboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, 1,2,5,6-diepoxycyclooctane. Among them, aromatic epoxides and alicyclic epoxides are preferable because they are superior in their curing ratio, and alicyclic epoxy resins are particularly preferable.

Examples of the vinyl ether compounds include monofunctional or polyfunctional vinyl ether compounds listed in the paragraphs regarding the radically polymerizable compounds.

As an oxetane compound, a compound having one to four oxetane rings in a structure thereof is preferable. By using such a compound, it is possible to easily keep a viscosity of the primer ink to the range which causes a good handling and to obtain a high adhesion between the cured ink for imaging and a recording medium. In particular, from the viewpoints of viscosity and adhesion of the primer ink, it is preferable to use a compound having one or two oxetane rings.

In particular, examples of the monofunctional oxetane compound include 3-ethyl-3-hydroxymethyl oxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethylene glycol (3-ethyl-3-oxetanylmethyl)ether, dicyclopentadiene (3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, bornyl(3-ethyl-3-oxetanylmethyl) ether.

Examples of the polyfunctional oxetane compound include 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, EO-modified bisphenol F (3-ethyl-3-oxetanylmethyl)ether. These oxetane compounds are described in detail in paragraphs [0021] to [0084] of JP 2003-341217 A, and they may be suitable for use in the primer ink of the present invention.

When the primer ink of the present invention contains a cationically polymerizable compound, the amount of the cationically polymerizable compound is preferably in the range of 50 to 95% by mass, and more preferably in the range of 60 to 92% by mass, based on the solid content of the primer ink.

The amount of the polymerizable compound in the primer ink of the present invention is preferably 50 to 99.6% by mass, and more preferably 60 to 99.0% by mass, based on the solid content of the primer ink.

<Polymerization Initiator>

The primer ink of the present invention contains a polymerization initiator. The polymerization initiator used in the present invention is a compound which generates an initiating species such as radicals by applying energy of light, heat or both, and initiates and promotes the polymerization or crosslinking reaction of the aforementioned polymerizable compound. In the present invention, the polymerization initiator is preferably a compound which initiates the polymerization or crosslinking reaction due to an actinic radiation or heat, and more preferably a compound which initiates the polymerization or crosslinking reaction by irradiation with an actinic radiation. By adding the polymerization initiator to the primer ink, it is possible to cure the primer ink which has been applied onto a recording medium by irradiation with an actinic radiation or by heating.

When the primer ink of the present invention contains a radically polymerizable compound as the polymerizable compound, it is preferable to use a polymerization initiator which initiates a radical polymerization (radically polymerization initiator). When the primer ink of the present invention contains a cationically polymerizable compound as the polymerizable compound, it is preferable to use a polymerization initiator which initiates a cationic polymerization (cationically polymerization initiator). In addition, these polymerization initiators are preferably photo-polymerization initiators. It is preferable to use a radically polymerizable compound and a radically polymerization initiator in the primer ink of the present invention, because a curing reaction can be carried out in a short time.

The photo-polymerization initiator may be appropriately selected from known photo-polymerization initiators which have a sensitivity to an actinic radiation such as Ultraviolet rays of 400 to 200 nm, far-ultraviolet radiation, g-rays, h-rays, i-rays, KrF excimer laser beam, ArF excimer laser beam, electron-rays, X-rays, molecular beam, LED beam or ion beam.

Examples of the photo-polymerization initiator which may be used in the primer ink of the present invention include (a) aromatic ketones, (b) aromatic onium salts, (c) organic peroxides, (d) hexaarylbiimidazole compounds, (e) ketoxime ester compounds, (f) borate compounds, (g) azinium compounds, (h) metallocene compounds, (i) active ester compounds and (j) compounds having a carbon-halogen bond.

Examples of the aromatic ketones (a) include a compound having a benzophenone skeleton or a thioxanthone skeleton, α-thio benzophenone compounds, benzoin ether compounds, α-substituted benzoin compounds, benzoin derivatives, aroylphosphonates, dialkoxy benzophenones, benzoin ethers, α-amino benzophenones, p-di(dimethylaminobenzoyl)benzene, thio-substituted aromatic ketones, acyl phosphine oxides, acylphosphines, thioxanthones and coumarins.

Examples of the aromatic onium salts (b) include the elements belonging to Group V, VI or VII of the periodic table. Specific examples thereof include an aromatic onium salt of N, P, As, Sb, Bi, O, S, Se, Te or I. It is preferable to use, for example, iodonium salts, sulfonium salts, diazonium salts (e.g., benzenediazonium optionally having a substituent), resins of diazonium salt (e.g., formaldehyde resin of diazodiphenylamine), and N-alkoxy pyridinium salts. These compounds generate a radical or an acid as an active species.

Examples of the organic peroxides (c) include an organic compound having one or more oxygen-oxygen bonds in the molecule.

Examples of the hexaarylbiimidazole compounds (d) include lophine dimers.

Examples of the ketoxime ester compounds (e) include 3-benzoyloxyiminobutan-2-one, 3-acetoxyiminobutan-2-one, 3-propionyloxyiminobutan-2-one, 2-acetoxyimimopentan-3-one, 2-acetoxyimino-1-phenylpropan-1-one, 2-benzoyloxyimino-1-phenylpropan-1-one, 3-p-tolueneoxyiminobutan-2-one and 2-ethoxycarbonyloxyimino-1-phenylpropan-1-one.

Examples of the borate compounds (f) include the compounds described in U.S. Pat. No. 3,567,453 B, U.S. Pat. No. 4,343,891 B, EP 109,772 B and EP 109,773 B.

Examples of the azinium compounds (g) include the compounds having an N—O bond, which are described in JP 63-138345 A, JP 63-142345 A, JP 63-142346 A, JP 63-143537 A or JP 46-42363 A.

Examples of the metallocene compounds (h) include titanocene compounds and iron-arene complexes.

Examples of the active ester compounds (i) include nitrobenzyl esters and iminosulfonate compounds.

Preferred examples of the compounds having a carbon-halogen bond (j) include compounds described in Wakabayashi et al., Bull. Chem. Soc., Japan, 42, 2924 (1969) and a compound described in F. C. Schaefer et al., J. Org. Chem. 29, 1527 (1964).

Among of the aforementioned photo-polymerization initiator, as the radically polymerization initiator which may be used in the primer ink of the present invention, the aromatic ketones (a) are preferable, the compounds having a benzophenone skeleton or a thioxanthone skeleton are more preferable, and α-aminoalkylphenones and acyl phosphine oxides are particularly preferable, from the viewpoint of the curability. As the cationically polymerization initiator, the aromatic onium salts (b) are preferable, the iodonium salts and the sulfonium salts are more preferable, and the iodonium salts and the sulfonium salts of PF6 are particularly preferable, from the viewpoint of the curability.

These polymerization initiators may be used alone or as a combination of two or more kinds thereof. In addition, the polymerization initiators may be used in combination with a known sensitizer for the purpose of improving sensitivity, insofar as the effect of the present invention is not impaired.

The amount of the polymerization initiator used in the primer ink of the present invention is preferably 0.1 to 20% by mass, and more preferably 0.5 to 10% by mass, based on the solid content of the primer ink.

The mixing ratio (ratio by mass) of the polymerization initiator to the polymerizable compound (polymerization initiator:polymerizable compound) is preferably 0.5:100 to 30:100, and more preferably 1:100 to 15:100.

<Colorant>

The primer ink of the present invention may contain a colorant when the reproducibility is more excellent depending on the characteristic of a printed image. However, the primer ink is preferably transparent which does not affect the drawing properties of the image forming ink on the primer ink for the purpose of obtaining a high-quality printed product.

When a colorant is added to the primer ink, particularly a white colorant may be preferably used as the colorant although a colorant which is used in image forming ink described later may be used. Also, when a colorant is used, it is preferable to add a dispersant (for example, those which may be used in image forming ink described later).

When the primer ink of the present invention contains a colorant, the amount of the colorant is preferably 0.1 to 30% by mass, and more preferably 0.5 to 20% by mass based on the total mass of the primer ink.

<Surface Modifier>

The primer ink of the present invention preferably contains a surface modifier in order to improve the wettability to a recording medium and to prevent repellency.

Specific examples of the surface modifier which may be used in the present invention include anionic surface modifiers such as dialkyl sulfosuccinates, alkylnaphthalene sulfonates, and fatty acid salts; nonionic surface modifiers such as polyoxyethylene alkyl ethers, polyoxyethylene alkyl allyl ethers, acetylene glycols, and polyoxyethylene/polyoxypropylene block copolymers; cationic surface modifiers such as alkylamines and quaternary ammonium salts; silicone-based surface modifiers; and fluorine-based surface modifiers.

The amount of the surface modifier contained in the primer ink of the present invention may be appropriately selected depending on the intended use, and it is generally 0.0001 to 1% by mass based on the total mass of the primer ink. The surface tension of the primer ink can be adjusted by controlling the addition amount of the surface modifier within the above range according to the need.

<Sensitizer>

The primer ink of the present invention may contain a sensitizing dye as a sensitizer for the purpose of improving the sensitivity of a photo-polymerization initiator. Preferable examples of the sensitizing dye include compounds belonging to the following compounds: polynuclear aromatics, xanthenes, cyanines, merocyanines, thiazines, acridines, anthraquinones, or coumarins and each having an absorption wavelength ranging from 350 nm to 450 nm.

<Cosensitizer>

Further, a known compound having an action such as further improvement of sensitivity or suppression of polymerization inhibitory by oxygen may be added as a cosensitizer. Examples of the cosensitizer include amines and specific examples thereof include triethanolamine, ethyl p-dimethylaminobenzoate, p-formyldimethylaniline, and p-methylthiodimethylaniline.

<Anti-Gelling Agent>

The primer ink of the present invention may contain an anti-gelling agent from the viewpoints of improving the storage stability and preventing the head clogging by thermal polymerization. Examples of the anti-gelling agent include hydroquinone, benzoquinone, p-methoxyphenol, hydroquinone monomethyl ether, hydroquinone monobutyl ether, TEMPO, TEMPOL, CUPFERRON Al, IRGASTAB UV-10, IRGASTAB UV-22, and FIRSTCURE ST-1 (manufactured by ALBEMARLE CORPORATION). When the anti-gelling agent is contained, the amount thereof is preferably 200 to 20,000 ppm based on the total mass of the primer ink.

<Solvent>

The primer ink of the present invention may optionally contain a known solvent. The solvent may be used for the purpose of adjusting the polarity, viscosity and surface tension of the primer ink, improving the solubility/dispersibility of the colorant, and adjusting the conductivity and the printing performance.

As the solvent, a high-boiling organic solvent having a characteristic superior in compatibility with constituent elements, particularly, monomers is preferable. Examples of the known solvent also include low-boiling organic solvents which are organic solvents having a boiling point of 100° C. or lower. However, there is a fear that the low-boiling organic solvents affect curability and it is therefore desirable not to use the low-boiling organic solvents in consideration of environmental pollution caused by the solvents. When the low-boiling organic solvents are used, it is preferable to use those high in safe [solvents having a high standard control concentration (index shown by working environment evaluation standard)) and, for example, those having a control concentration of 100 ppm or more are preferable, and more preferably 200 ppm or more. Examples of the solvent include alcohols, ketones, esters, ethers, and hydrocarbons. Specific examples of these solvents include methanol, 2-butanol, acetone, methyl ethyl ketone, ethyl acetate, and tetrahydrofuran.

These solvents may be used alone or in combinations of two or more thereof. When water and/or a low-boiling organic solvent is used, the use amount of the both is preferably 0 to 20% by weight and more preferably 0 to 10% by weight in the primer ink, and it is preferable that the both are not substantially contained. Preferably, the primer ink of the present invention does not substantially contain water from the viewpoints of stability with time, that is, non-uniformization with time, generation of turbidity of a liquid caused by precipitation of dyes, and the like, and also from the viewpoint of drying properties when a non-permeable or low-permeable recording medium is used. Herein, the expression "does not substantially contain" means that the presence of unavoidable impurities is allowed.

<Other Components>

The primer ink of the present invention may further contain a storage stabilizer, conductive salts, other additives and the like depending on the intended use.

As the other additives, known additives such as polymers, ultraviolet absorbers, antioxidants, color-fading inhibitors, and pH adjusters may be appropriately selected and used. With regard to the ultraviolet absorbers, antioxidants, color-fading inhibitors, and pH adjusters, for example, additives described in JP-A-2001-181549 may be specifically used.

For example, a pair of compounds which undergo reaction by mixing to generate an aggregate or to be thickened may be contained separately in the primer ink of the present invention and in the image forming ink used together with the primer ink. The pair of compounds has a feature that they rapidly generate an aggregate or rapidly thicken an ink solution, and can therefore suppress the coalescence of adjacent liquid droplets more efficiently.

The primer ink of the present invention is applied onto a recording medium by ink-jet systems. For this purpose, it is necessary that the physical properties of the primer ink be fitted to the ink-jet systems.

Specifically, the primer ink of the present invention has a surface tension of 25 mN/m to 31 mN/m. When the surface tension of the primer ink is less than 25 mN/m, the primer ink easily repels the image forming ink when an image is formed, and there is the possibility that the image cannot be drawn, whereas when the surface tension exceeds 31 mN/m, the image forming ink easily spreads when the image is formed, and there is the possibility that the ink is blurred. When the surface tension is far beyond the range of 25 mN/m to 31 mN/m, the primer ink is out of IJP aptitude and there is the possibility that the ink itself is inferior in discharging.

The primer ink of the present invention has a viscosity of 50 mPa·s or less at 25° C. When the viscosity exceeds 50 mPa·s, the ink is deteriorated in discharge properties from ink head in the case of being discharged by inkjet systems. Though no particular limitation is imposed on the lower limit of the viscosity of the primer ink, the lower limit of the viscosity is normally about 3.0 mPa·s.

Generally, in an ink-jet recording method, adjacent ink liquid droplets, which are provided with an overlapped part in order to obtain a high image density, are left in contact with each other on a recording medium before dried. Therefore, the adjacent ink liquid droplets coalesce, which leads to the generation of image blurring and non-uniform line width of fine lines, and therefore the formation of a sharp image is easily deteriorated. In the present invention, the constitution is adopted in which a primer layer is disposed on a recording medium by using the primer ink of the present invention, so that the coalescence of the adjacent ink liquid droplets can be suppressed by the interaction between the primer ink and the ink liquid droplets forming an image. Accordingly, the blurring of an image, the non-uniform line width of fine lines or the like in an image, and the generation of color unevenness on a color surface are efficiently prevented.

Here, the adjacent ink liquid droplets mean liquid droplets which are formed using monochromatic ink and ejected from the ink discharge port in an overlapped manner, or liquid droplets which are formed using inks having colors differing from each other and ejected from the ink discharge port in an overlapped manner. The adjacent ink liquid droplets may be liquid droplets ejected simultaneously or may be a preceding liquid droplet and a succeeding liquid droplet with a relationship of preceding droplet and succeeding droplet.

Therefore, the primer ink of the present invention is used in combination with at least one image forming ink as a liquid for forming an image.

In the present invention, the ink used for forming an image is not particularly limited. A known ink composition which is usually used in the ink-jet system can be used. It is preferable to use an ink composition comprising an energy ray-curable polymerizable compound and a pigment as a colorant.

Hereinafter, the particularly suitable image forming ink for using in combination with the primer ink of the present invention will be described. In the present specification, hereinafter, the term "image forming ink composition" means an individual ink composition which constitutes the image forming ink used for forming an image (the image forming ink usually consists of several ink compositions for forming an image).

The image forming ink composition is designed so that at least an image can be formed by the ink composition. In particular, for example, the ink composition comprises at least one polymerizable compound and at least one colorant, as well as optionally comprises a polymerization initiator, a surface modifier, an anti-gelling agent and the other additives.

For example, the polymerizable compound can be appropriately selected from the radically polymerizable compounds and the cationically polymerizable compounds, which are already mentioned as the polymerizable compounds for use in the primer ink of the present invention. Both of the radically polymerizable compound and the cationically polymerizable compound may be used, or only one of them may be used.

From the viewpoint of the curing rate, it is preferable to use (meth)acrylates or (meth)acrylamides as the polymerizable compound for use in the image forming ink composition. In particular, it is preferable to mainly use a monofunctional polymerizable compound. Preferable, the ink composition comprises a tetrafunctional or higher polyfunctional (meth)acrylate. In addition, it is preferable to use a trifunctional or higher polyfunctional (meth)acrylate in combination with a mono- or bifunctional (meth)acrylate or a (meth)acrylamide, from the viewpoints of reducing a viscosity of the image forming ink composition and improving an adhesion.

In the image forming ink composition, the mixing ratio (ratio by mass) of the monofunctional monomers to the polyfunctional monomers (monofunctional monomers:polyfunctional monomers) is preferably 9:1 to 1:9, more preferably 8:2 to 2:8, and still more preferably 4:6 to 2:8. When the mixing ratio of the monofunctional monomers and the polyfunctional monomers is within the above-mentioned range, an image forming ink composition having an appropriate curing rate and viscosity can be obtained.

The amount of the polymerizable compound is preferably 50 to 99.6% by mass, and more preferably 60 to 99.0% by mass, based on the solid content (mass) of the image forming ink composition.

The polymerization initiator can be appropriately selected from the photo-polymerization initiators which are already mentioned as those for use in the primer ink of the present invention. When a radically polymerizable compound is used as the polymerizable compound, it is preferable to use a radically polymerization initiator. When a cationically polymerizable compound is used as the polymerizable compound, it is preferable to use a cationically polymerization initiator.

As the radically polymerization initiator, the aromatic ketones are preferable, the compounds having a benzophenone skeleton or a thioxanthone skeleton are more preferable, and α-aminoalkylphenones and acyl phosphine oxides are particularly preferable, from the viewpoint of the curability. As the cationically polymerization initiator, the aromatic onium salts are preferable, the iodonium salts and the sulfonium salts are more preferable, and the iodonium salts and the sulfonium salts of PF6 are particularly preferable, from the viewpoint of the curability. These polymerization initiators may be used alone or as a combination of two or more kinds thereof. In addition, the polymerization initiators may be used in combination with a known sensitizer for the purpose of improving sensitivity.

It is preferable to use the polymerizable initiator in such an amount that the intended storage stability of the image forming ink composition is attained. The amount of the polymerization initiator in the ink composition is preferably 0.1 to 20% by mass, and more preferably 0.5 to 10% by mass, based on the solid content of the image forming ink composition. In addition, the mixing ratio (ratio bay mass) of the polymerization initiator to the polymerizable compound (polymerization initiator:the polymerizable compound) is preferably 0.5:100 to 30:100, and more preferably 1:100 to 15:100.

The image forming ink is usually a multi-color ink set consisting of several ink compositions for forming an image. The image forming ink preferably comprises at least one coloring ink composition selected from the group consisting of an ink composition having a cyan color (cyan ink composition), an ink composition having a magenta color (magenta ink composition), an ink composition having a yellow color (yellow ink composition), an ink composition having a black color (black ink composition) and an ink composition having a white color (white ink composition). In some cases, it is possible to form an image having a good color reproducibility by using a custom color such as violet, blue, green, orange and red.

Therefore, the image forming ink composition preferably contains at least one colorant. Each color ink composition contains at least one colorant having a corresponding color. The colorant used in the ink composition is not particularly limited, and is selected from known water-soluble dyes, oil-soluble dyes and pigments. The colorant in the image forming ink composition which is used in combination with the primer ink of the present invention is preferably an oil-soluble dye or a pigment, which is easily, uniformly dispersed or dissolved in a water-insoluble medium, because the primer ink of the present invention is a non-aqueous liquid. A pigment is particularly preferable.

The pigment may be an organic pigment or an inorganic pigment.

As for a black pigment, for example, a carbon black pigment is preferably used. In general, a black pigment and pigments of three primary colors, namely, cyan, magenta and yellow are used. At least one pigments having other hues, for example a metallic luster pigment such as gold and silver, and a colorless and a pale extender pigment may also be used according to the purpose.

Examples of the pigment having a magenta color include a monoazo pigment such as C.I. Pigment Red 3 (e.g., toluidine red), a disazo pigment such as C.I. Pigment Red (e.g., Pyrazolone Red B), an azo lake pigment such as C.I. Pigment Red 53:1 (e.g., Lake Red C) and C.I. Pigment Red 57:1 (Brilliant Carmine 6B), a condensed azo pigment such as C.I. Pigment Red 144 (e.g., Condensed Azo Red BR), a perinone pigment such as C.I. Pigment Red 194 (e.g., perinone red), a perylene pigment such as C.I. Pigment Red 149 (e.g., perylene scarlet), C.I. Pigment Violet 19 (non-substituted quinacridone, CINQUASIA Magenta RT-355T; manufactured by Ciba Specialty Chemicals Inc.), a quinacridone pigment such as C.I.

Pigment Red 122 (e.g., quinacridone magenta), an isoindolinone pigment such as C.I. Pigment Red 180 (e.g., Isoindolinone Red 2BLT), and an alizarin lake pigment such as C.I. Pigment Red 83 (e.g., Madder Lake).

Examples of the pigment having a cyan color include a disazo pigment such as C.I. Pigment Blue 25 (e.g., dianisidine blue), a phthalocyanine pigment such as C.I. Pigment Blue 15, C.I. Pigment Blue 15:3 (IRGALITE BLUE GLO; manufactured by Ciba Specialty Chemicals) (e.g., phthalocyanine blue), an acid dye lake pigment such as C.I. Pigment Blue 24 (e.g., Peacock Blue Lake), and an alkali blue pigment such as C.I. Pigment Blue 18 (e.g., Alkali Blue-V-5:1).

Examples of the pigment having a yellow color include a monoazo pigment such as C.I. Pigment Yellow 1 (e.g., Fast Yellow G) and C.I. Pigment Yellow 74, a disazo pigment such as C.I. Pigment Yellow 12 (e.g., Disazo Yellow AAA) and C.I. Pigment Yellow 17, a non-benzidine azo pigment such as C.I. Pigment Yellow 180, C.I. Pigment Yellow 200 (Novoperm Yellow 2HG), an azo lake pigment such as C.I. Pigment Yellow 100 (e.g., Tartrazine Yellow Lake), a condensed azo pigment such as C.I. Pigment 95 (e.g., Condensed Azo Yellow Lake GR), an acid dye lake pigment such as C.I. Pigment Yellow 115 (e.g., Quinoline Yellow Lake), a basic dye lake pigment such as C.I. Pigment Yellow 18 (e.g., Thioflavin Lake), an anthraquinone pigment such as Flavanthrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (e.g., Nickel Nitroso Yellow) and an azomethine metal complex pigment such as C.I. Pigment Yellow 117 (e.g., Copper Azomethine Yellow).

Examples of the pigment having a black color include a carbon black, a titanium black and an aniline black. Examples of the carbon black include SPECIAL BLACK 250 (manufactured by Degussa).

Examples of the white pigment include Pigment White 6, 18 and 21. In particular, as the white pigment, basic lead carbonate ($2PbCO_3Pb(OH)_2$, so-called silver white), zinc oxide (ZnO, so-called zinc white), titanium oxide ($TiO_2$, so-called titanium white), and strontium titanate ($SrTiO_3$, so-called titanium strontium white) are available. Titanium oxide has a lower specific density than the other white pigments. Titanium oxide also has a high refractive index and is chemically and physically stable, and because of this, titanium oxide has high hiding and coloring abilities, and is superior in the durability against acid, alkali or the other environment. Therefore, it is preferable to use titanium oxide as for the white pigment. It is possible to use the other white pigments (any white pigments other than the aforementioned white pigments can be used), if necessary.

Among of these known pigments, C.I. Pigment Blue 15:3 and C.I. Pigment Blue 15:4 are preferable as for the pigment having a cyan color, C.I. Pigment Red 122, C.I. Pigment Red 202 and C.I. Pigment Violet 19 are preferable as for the pigment having a magenta color, and C.I. Pigment Yellow 150, C.I. Pigment Yellow 180 and C.I. Pigment Yellow 155 are preferable as for the pigment having a yellow color. In addition, it is preferable to use titanium oxide as for the pigment having a white color.

Examples of the custom color pigments such as violet, blue, green, orange and red pigments, which may be used as necessary to obtain an image having an excellent color reproduction, include the following pigments.

Examples of the pigment having a violet color include C.I. Pigment Violet 1 (Rhodamine B), C.I. Pigment Violet 2 (Rhodamine 3b), C.I. Pigment Violet 3 (Methyl Violet Lake), C.I. Pigment Violet 3:1 (Methyl Violet Lake), C.I. Pigment Violet 3:3 (Methyl Violet Lake), C.I. Pigment Violet 5:1 (alizarin maroon), C.I. Pigment Violet 13 (ultramarine pink), C.I. Pigment Violet 17 (Naphthol AS), C.I. Pigment Violet 23 (dioxazine violet), C.I. Pigment Violet 25 (Naphthol AS), C.I. Pigment Violet 29 (perylene violet), C.I. Pigment Violet 31 (violanthrone vioret), C.I. Pigment Violet 32 (Benzimidazolone Bordeaux HF3R), C.I. Pigment Violet 36 (thioindigo), C.I. Pigment Violet 37 (dioxazine violet), C.I. Pigment Violet 42 (Quinacridone Maroon B), and C.I. Pigment Violet 50 (Naphthol AS). These pigments are commercially available.

Examples of the pigment having a blue color include C.I. Pigment Blue 1, C.I. Pigment Blue 2, C.I. Pigment Blue 16, C.I. Pigment Blue 22, C.I. Pigment Blue 60, and C.I. Pigment Blue 66. These pigments are commercially available.

Examples of the pigment having a green color include C.I. Pigment Green 1 (Brilliant Green Lake), C.I. Pigment Green 4 (Malachite Green Lake), C.I. Pigment Green 7 (Phthalocyanine Green), C.I. Pigment Green 8 (Pigment Green B), C.I. Pigment Green 10 (Nickel Azo Yellow), C.I. Pigment Green 36 (brominated Phthalocyanine Green). These pigments are commercially available.

Examples of the pigment having an orange color include C.I. Pigment Orange 1 (Hansa Yellow 3r), C.I. Pigment Orange 2 (ortho-nitro orange), C.I. Pigment Orange 3 (β-naphthol), C.I. Pigment Orange 4 (Naphthol AS), C.I. Pigment Orange 5 (β-naphthol), C.I. Pigment Orange 13 (Pyrazolone Orange G), C.I. Pigment Orange 15 (disazo orange), C.I. Pigment Orange 16 (Anisidine Orange), C.I. Pigment Orange 17 (Persian Orange Lake), C.I. Pigment Orange 19 (Naphthalene Yellow Lake), C.I. Pigment Orange 24 (Naphthol Orange Y), C.I. Pigment Orange 31 (Condensed Azo Orange), C.I. Pigment Orange 34 (pyrazolone Orange), C.I. Pigment Orange 36 (Benzimidazolone Orange HL), C.I. Pigment Orange 38 (naphthol orange), C.I. Pigment Orange 40 (pyranthrone Orange), C.I. Pigment Orange 43 (perinone orange), C.I. Pigment Orange 46 (Ethyl Red Lake C), C.I. Pigment Orange 48 (quinacridone gold), C.I. Pigment Orange 49 (quinacridone gold), C.I. Pigment Orange 51 (pyranthrone orange), C.I. Pigment Orange 60 (Imidazolone Orange HGL), C.I. Pigment Orange 61 (isoindolinone orange), C.I. Pigment Orange 62 (Benzimidazolone Orange H5G), C.I. Pigment Orange (benzimidazolone), C.I. Pigment Orange 65 (azomethine orange), C.I. Pigment Orange 66 (isoindoline orange), C.I. Pigment Orange 67 (pyrazoloquinazolone Orange), C.I. Pigment Orange 68 (azomethine orange), C.I. Pigment Orange (isoindolinone orange), C.I. Pigment Orange 71 (diketopyrrolopyrrole orange), C.I. Pigment Orange 72 (Imidazolone Orange H4GL), C.I. Pigment Orange 73 (diketopyrrolopyrrole orange), C.I. Pigment Orange 74 (Naphthol Orange 2RLD), and C.I. Pigment Orange 81 (diketopyrrolopyrrole orange). These pigments are commercially available.

Examples of the pigment having a red color include C.I. Pigment Red 171, C.I. Pigment Red 175, C.I. Pigment Red 176, C.I. Pigment Red 177, C.I. Pigment Red 209, C.I. Pigment Red 220, C.I. Pigment Red 224, C.I. Pigment Red 242, C.I. Pigment Red 254, C.I. Pigment Red 255, C.I. Pigment Red 264, and C.I. Pigment Red 270. These pigments are commercially available.

Among them, C.I. Pigment Violet 23 is preferable as for the pigment having a violet color, C.I. Pigment Orange 36 and C.I. Pigment Orange 71 are preferable as for the pigment having an orange color, and C.I. Pigment Green 7 and C.I. Pigment Green 36 are preferable as for the pigment having a green color, from the viewpoints of the color reproducibility, light resistance and stability of the pigment dispersion.

In the present invention, it is preferable to use an image forming ink composition comprising the aforementioned custom color pigment and each color ink composition comprising a pigment and/or dye having a cyan color, a magenta color, a yellow color, a black color or a white color.

The dispersion of the colorant can be carried out by using a dispersing device such as a bead mill, a ball mill, a sand mill, an attritor, a roll mill, a jet mill, a homogenizer, a paint shaker, a kneader, an agitator, Henschel mixer, a colloid mill, an ultrasonic homogenizer, a pearl mill, and a wet jet mill. When the colorant is dispersed, a dispersant may be used.

In addition, when the colorant is added, a synergist corresponding to each colorant may be used as a dispersant, if necessary. As a dispersion medium for various components such as a colorant, at least one solvent may be used. It is also possible to be solventless and to use a low-molecular weight polymerizable compound as a dispersant. Because the primer ink of the present invention is preferably an energy-ray curable liquid, the image forming ink composition which is used in combination with the primer ink is also preferably an energy-ray curable liquid. Furthermore, the ink composition is preferably free from a solvent so that the primer ink and the image forming ink composition are cured after they are applied on a recording medium. This is because that when a solvent remains in the formed image the residual solvent results in reduced solvent resistance of the image and problems of VOC (Volatile Organic Compound). From these points, it is preferable to use a polymerizable compound as a dispersant, it is more preferable to select a low-viscosity polymerizable compound from the viewpoints of dispersibility and improving a handleability of the ink composition.

The average particle diameter of the colorant is preferably 0.01 μm or more and 0.4 μm or less, and more preferably 0.02 μm or more and 0.2 μm or less, since the finer the average particle diameter of the colorant used is, the higher the color developability tend to be. The colorant, dispersant and dispersion medium and the dispersion and filtration conditions are preferably selected so that the maximum particle diameter is preferably in a range of 3 μm or less, and more preferably in a range of 1 μm or less. By controlling the particle diameter, it is possible to prevent the nozzle head clogging and to maintain the storage stability, transparency and curable sensitivity of the ink solution.

The particle diameter of the colorant can be measured by known measurement methods. In particular, the particle diameter can be measured by, for example, centrifugal sedimentation method of light transmission type, X-ray transmission method, laser diffraction/scattering method or dynamic light scattering method.

The amount of the colorant in the image forming ink composition can be appropriately selected depending on the color and the intended use. From the viewpoints of image density and the storage stability, the amount of the colorant is preferably 0.1 to 30% by mass, and more preferably 0.5 to 20% by mass, based on the total mass of the image forming ink composition.

The colorant may be used alone or as a mixture of two or more kinds thereof. The colorant may be used as combinations of two or more organic pigments or solid solutions of organic pigment. For each droplet or liquid to be ejected, the different colorants may be used, or the same colorant may be used.

It is preferable to add at least one dispersant when the colorant is dispersed. The dispersant is not particularly limited, but a known polymer dispersant is preferable. Examples of the polymer dispersant include DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174 and DisperBYK-182 (manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575 and EFKA7580 (manufactured by EFKA Additives), polymeric dispersant such as Disperse Aid 6, Disperse Aid 8, Disperse Aid 15 and Disperse Aid 9100 (manufactured by Sannopco); solsperse dispersants such as Solsperse 3000, 5000, 9000, 12000, 13240, 13940, 17000, 24000, 26000, 28000, 32000, 36000, 39000, 41000 and 71000 (manufactured by Avecia); Adeka Pluronic L31, F38, L42, L44, L61, L64, F68, L72, P95, F77, P84, F87, P94, L101, P103, F108, L121, P-123 (manufactured by Asahi Denka Co., Ltd.) and Isonet S-20 (manufactured by Sanyo Chemical Industries), Disparlon KS-860, 873SN, 874 (polymer dispersant), #2150 (aliphatic polyhydric carboxylic acid) and #7004 (polyether ester type) (manufactured by Kusumoto Chemicals).

Pigment derivatives such as phthalocyanine derivative (trade name: EFKA-745, manufactured by EFKA Additives), Solsperse 5000, 12000, and 22000 (manufactured by Avecia) may be used. It is possible to obtain a uniform and stable dispersion by using the aforementioned dispersants having a good dispersibility and stability, even if a fine particle colorant is used.

The amount of the dispersant may be appropriately selected depending on the intended use, and it is preferably 0.01 to 5% by mass based on the total mass of the image forming ink composition.

The surface modifier can be appropriately selected from the surface modifiers which are already mentioned as those for use in the primer ink of the present invention. The ink composition preferably contains a surface modifier in order to attain long-term stable emission performance. The amount of the surface modifier may be appropriately selected depending on the intended use of the ink. Typically, it is preferably 0.0001 to 1% by mass based on the total mass of the image forming ink composition.

The anti-gelling agent can be appropriately selected from the anti-gelling agents which are already mentioned as those for use in the primer ink of the present invention. The image forming ink composition is preferably heated at a range of 40° C. to 80° C. so that the ink composition becomes low viscosity for ejection. Thus, it is preferable to incorporate an anti-gelling agent to the ink composition in order to prevent the head clogging by thermal polymerization. The image forming ink composition preferably contains the anti-gelling agent in an amount of 200 ppm to 20,000 ppm based on a total amount of the ink composition.

The image forming ink composition which is used in combination with the primer ink of the present invention may contain a sensitizer, a co-sensitizer, a storage stabilizer, an electronically conductive salt, a solvent and the other additives, in addition to the aforementioned components. These components can be appropriately selected from those which are already mentioned as the additives for use in the primer ink of the present invention.

The image forming ink composition which is used in combination with the primer ink of the present invention preferably has a surface tension of 25 mN/m to 32 mN/m.

In the ink-jet recording method using the primer ink of the present invention, any of a permeable recording medium, a non-permeable recording medium, and a low-permeable recording medium may be used as a recording medium.

In particular, the effect of the present invention is exerted more significantly in the non-permeable or low-permeable recording medium. Here, the permeable recording medium in this specification refers to a recording medium into which whole liquid permeates in a time of 100 milliseconds or shorter when 10 pL (pico liter) of ink liquid droplets is dropped on the recording medium. Further, the non-permeable recording medium refers to a recording medium into which substantially no liquid droplet permeates. The expression "substantially no liquid droplet penetrates" means that, for example, the permeability of liquid droplets after one minute is 5% or less. The low-permeable recording medium refers to a recording medium into which whole liquid permeates in a time of 100 milliseconds or longer when 10 pL of ink liquid droplets is dropped on the recording medium.

Examples of the permeable recording medium include plain paper, porous paper, and other recording media which can absorb a liquid. Examples of the non-permeable or low-permeable recording medium include art paper, synthetic resins, rubber, resin-coated paper, glass, metals, ceramics, and woods. In the present invention, composite recording media obtained by combining two or more of these materials may be used for the purpose of adding functions.

Examples of the synthetic resin include, though any synthetic resin may be used, polyesters such as polyethylene terephthalate and polybutadiene terephthalate, polyolefins such as polyvinyl chloride, polystyrene, polyethylene, polyurethane, and polypropylene, acrylic resins, polycarbonates, acrylonitrile/butadiene/styrene copolymers, diacetate, triacetate, polyimide, cellophane, and celluloid. No particular limitation is imposed on the thickness and shape of the recording medium when a synthetic resin is used, and any form including a film form, card form, and block form may be adopted. The recording medium may be either transparent or opaque.

As the form of the synthetic resin in use, the synthetic resin is preferably used in a film form as used in so-called soft packaging or various non-absorbable plastics and their films may be used. Examples of the plastic film include PET films, OPS films, OPP films, PNY films, PVC films, PE films, TAC films, and PP films. As the other plastics, polycarbonate, acryl resins, ABS, polyacetal, PVA, or rubber may be used.

Examples of the resin-coated paper include transparent polyester films, opaque polyester films, opaque polyolefin resin films, and paper supports obtained by laminating both surfaces of paper with a polyolefin resin. A paper support obtained by laminating both surfaces of paper with a polyolefin resin is particularly preferable.

No particular limitation is imposed on the metal, and examples thereof include aluminum, iron, gold, silver, copper, nickel, titanium, chromium, molybdenum, silicon, lead, zinc, and stainless steel, and composite materials of these metals.

When an image is recorded on, as the recording medium, a poorly adhesive recording medium made of a non-permeable or low-permeable synthetic resin having low liquid absorbability, the adhesion is improved by using the primer ink of the present invention, and therefore it is particularly effective. Examples of the recording medium on which the primer ink of the present invention produces an effect include, particularly, recording media having no permeability (for example, OPP (Oriented Polypropylene Film), CPP (Casted Polypropylene Film), PE (polyethylene), PET (Polyethylene terephthalate), PP (Polypropylene), metal plates, soft packaging materials having low permeability, laminate paper, coated paper, and art paper). When these recording media are used, a good image can be formed.

When the aliphatic hydrocarbon-based monofunctional monomer is an acyclic hydrocarbon-based monofunctional monomer, excellent fixation properties of an image to a recording medium made of an inorganic type material (for example, glass) can be attained. On the other hand, when the aliphatic hydrocarbon-based monofunctional monomer is an alicyclic hydrocarbon-based monofunctional monomer, excellent fixation properties of an image to a recording medium made of an organic type material (for example, plastics) can be attained.

A preferable ink-jet recording method using the primer ink of the present invention is a method in which the primer ink of the present invention is applied onto a recording medium by ink-jet systems to thereby provide a primer layer, and at the same time and/or just after the formation of the primer layer, an image forming ink composition which is cured by irradiation with energy rays is discharged on the primer layer to cure the image forming ink composition by the energy rays.

Though there is a case where only a monochromatic image forming ink composition is discharged in accordance with a desired image, multicolor image forming ink compositions are discharged sequentially or simultaneously to form an image when a full-color image is formed. In this case, the image is optical information including characters, diagrams or charts, and photographs, and may be any of a monochromatic, monocolor, and full-color image.

In the present invention, the primer ink is preferably applied to the same area as an image formed by discharging the image forming ink composition on a recording medium or to a wider area than the image. That is, a specific embodiment of the ink-jet recording method using the primer ink of the present invention includes a step of applying the primer ink of the present invention to the same area as an image formed by ejecting liquid droplets of a plurality of image forming ink compositions each having a different color on a recording medium or to a wider area than the image; a step of applying active energy rays or heat to the primer ink applied onto the recording medium; and a step of ejecting liquid droplets of the plurality of image forming ink compositions each having a different color on the recording medium onto which the primer ink has been applied.

In order to attain this object, the primer ink of the present invention is preferably used as one of ink sets simultaneously when a plurality of image forming inks each having a different color is used as a multicolor ink set. That is, this object is attained by a simple method in which at least one ink case among the ink cases constituting the multi-pass ink set is replaced with an ink case filled with the primer ink of the present invention.

Further, to the method may be added a step in which the primer ink is applied onto a recording medium in advance, and then a recording image is fixed by applying energy after at least the image forming ink is all ejected in order to obtain excellent fixation properties. A curing reaction associated with polymerization or crosslinking of polymerizable compounds contained in the ink is promoted by applying energy, and a more firm image can be formed more efficiently. In a system containing, for example, a polymerization initiator, the generation of active species from the polymerization initiator is promoted by the application of active energy such as active energy rays or heating, and also an increase in active species and a rise in temperature promote a curing reaction associated with polymerization or crosslinking of polymerizable compounds caused by the active species.

The application of energy can be preferably carried out by irradiation with conventionally known energy rays (energy rays are also referred to as actinic radiation) or by heating. As the energy rays, the same rays as active light used for image fixation may be used, and examples thereof include LED light rays, ultraviolet rays, visible rays, α-rays, γ-rays, X-rays, and electron-rays. Ultraviolet rays or visible rays are preferable from the viewpoints of cost and safety. Preferable examples of a light source for exposure include a metal halide lamp, a xenon lamp, a tungsten lamp, a carbon arc lamp, and a mercury lamp.

When energy is applied by irradiation of active light, the quantity of energy required for the curing reaction is vary depending on the kind and content of the polymerization initiator, and is generally preferably about 100 mJ/cm² or more and 10,000 mJ/cm² or less. When energy is applied by heating, it is preferable to heat for 0.1 to 1 second in the condition that the surface temperature of the recording medium is in a range from 40° C. to 80° C.

Hereinafter, the step of forming an image using the primer ink of the present invention will be described in more detail.

<Primer Solution Curing Process>

In the present invention, the primer ink itself is applied to a recording medium by ink-jet systems. Therefore, as mentioned above, it is preferable to use the primer ink as one of ink sets simultaneously when a plurality of image forming inks each having a different color is used as a multicolor ink set. Accordingly, the curing process of the primer ink is determined by an ink-jet recording system and the configuration of an ink-jet recording device.

That is, if the ink-jet recording system/device is a single-pass system and a system in which a head exclusive for the primer ink and an irradiator are installed, the image forming ink is applied onto a primer layer after a primer solution used for the primer layer is cured. In a multi-pass system, the image forming ink is discharged after the curing treatment of the primer ink though a difference between the application times of the both is small even when the primer ink is applied at almost the same time as the image forming ink. The primer ink of the present invention may be applied to any of the above system. However, it is preferably applied industrially to the latter system from the viewpoints of operability and productivity.

<Applications of Primer Solution and Image Forming Ink>

In the present invention, the primer ink may be applied onto the recording medium by using an application device, an inkjet nozzle, or the like. The image forming ink is ejected by using an ink jet nozzle or the like to apply it onto the primer layer.

(i) Discharging Using an Ink Jet Nozzle

When the primer ink is discharged by an ink jet nozzle, an aspect is preferable in which the image forming ink is ejected by an ink jet nozzle at almost the same time to form an image though there is a small time lag between ejections of the primer ink and the image forming ink.

With regard to the condition under which the primer ink is applied by an ink jet nozzle, for example, a head having a larger liquid droplet discharging capacity and a lower nozzle density than the head used to discharge the image forming ink is arranged as a full-line head unit in the direction of the width of the recording medium to thereby discharge the primer solution. A head having such a large liquid droplet discharging capacity generally has a large discharging force, so that it easily copes with a high-viscosity primer ink and is advantageous in suppression of the clogging of the nozzle. When a head having a large liquid droplet discharging capacity is used, the ejection resolution of the primer ink in the direction of the travel of the recording medium is dropped, so that it is advantageous in the point that an inexpensive head driven at a lower frequency can be applied.

(Ii) Application Using Application Device

When the primer ink is applied onto the recording medium by using an application device, the liquid droplets of the image forming ink may be ejected by an inkjet nozzle after the application of the primer ink.

In any of the above aspects, other liquids except for the primer ink and the image forming ink may be further applied. The applications of the other liquids may be performed by any method including application using an application device or discharging using an inkjet nozzle, and no particular limitation is imposed on the timing of the application. When the other liquids contain colorants, discharging using an ink jet nozzle is preferable and it is preferable to apply the liquids after the primer ink is applied.

As the ink-jet recording system, known systems may be preferably used which include, for example, an electrostatically extracted ink-jet system that discharge an ink liquid by utilizing electrostatic force, a drop-on-demand system (pressure pulse system) utilizing the oscillation pressure of a piezoelectric element, a sound ink-jet system in which an electric signal is converted into a sound beam, the beam is applied to an ink liquid to discharge the ink liquid by utilizing radiation pressure, and a thermal ink-jet system that utilizes the pressure generated by forming air cells obtained by heating an ink liquid. The ink-jet recording system includes a system that injects a large number of ink liquid having a low concentration, the ink being called photo ink, in a small volume, a system using a plurality of ink liquids each having substantially the same hue and different concentration to improve image qualities, and a system using a colorless and transparent ink liquid.

In the present invention, the liquid droplets of the image forming ink discharged on the primer ink are ejected in a liquid droplet size of, preferably, 0.1 pL or more and 100 pL or less (preferably by an ink jet nozzle), and more preferably 0.5 pL or more and 50 pL or less. When the liquid droplet size is within the above range, this is effective in the point that an image can be drawn in a highly sharp image density.

The application amount of the primer ink (ratio by weight per area) is in a range of, preferably, 0.05 to 5, more preferably 0.07 to 4, and particularly preferably 0.1 to 3 when the amount of the liquid droplets of the image forming ink is set to 1.

The thickness of the primer liquid layer formed by applying the primer ink on a recording medium (substrate) and the thickness of the undercoat layer which is obtained by curing the primer liquid layer are preferably 1 µm or more and 20 µm or less, more preferably 2 µm or more and 10 µm or less, and even more preferably 3 µm or more and 8 µm or less. When the thickness of the primer liquid layer or undercoat layer is within the above range, this is preferable because the flexibility and adhesiveness of the cured image can be well maintained.

The ejection interval from the application of the primer ink to the ejection of the image forming ink is preferably in a range of 5 microseconds or longer and 10 seconds or shorter. When the ejection interval is within the above range, this is effective in the point that the effect of the present invention can be significantly exerted. The ejection interval of the ink liquid droplets is more preferably 10 microseconds or longer and 5 seconds or shorter, and particularly preferably 20 microseconds or longer and 5 seconds or shorter.

EXAMPLES

Hereinafter, the present invention will be described in more detail by way of Examples. The unit "part" used in Tables means "part by mass".

The components of the primer inks and of image forming ink compositions, which were used in Examples and Comparative examples, are given in Table 1.

TABLE 1

Table 1: Components of primer ink and image forming ink composition

|  |  |  | Components | Kinds | Trade names and Specifications |
|---|---|---|---|---|---|
| Colorant |  |  | MA-8 | Acidic carbon black pigment (MA-8) | MA-8, manufactured by Mitsubishi Chemical Corporation |
|  |  |  | Yellow G01 | Nickel azo pigment (Yellow G01) | Yellow G01, manufactured by Levascreen |
|  |  |  | RT355D | Quinacridone pigment (RT355D) | CINQUASIA Magenda RT-355-D, manufactured by Ciba |
|  |  |  | P-BFS | Copper phthalocyanine pigment (P-BFS) | HOSTAPERM BLUE P-BFS, manufactured by clariant |
|  |  |  | JR-806 | Titanium oxide (JR806) | JR806 (rutile-type, surface modified with alumina-silica), manufactured by tayca |
| Dispersant |  |  | Sol. 33000 | Comb copolymer having basic functional group | Solsperse 33000, manufactured by Avecia |
| Polymerizable compound | Monofunctional monomer | Monofunctional monomer having aromatic ring structure | PEA | Phenoxyethyl acrylate | Sartomer SR339 (ethylenic double bond/molecule: 1), manufactured by Sartomer |
|  |  |  | HPPA | 2-hydoxy-3-phenoxypropyl acrylate | Aronix M-5700 (ethylenic double bond/molecule: 1), manufactured by TOAGOSEI CO., LTD. |
|  |  | Acyclic hydrocarbon-based monofunctional monomer | IOA | Isooctyl acrylate (IO-A) | Sartomer SR440 (ethylenic double bond/molecule: 1), manufactured by Sartomer |
|  |  |  | 2-EHA | 2-ethylhexyl acrylate (2-EHA) | 2-ethylhexyl acrylate (ethylenic double bond/molecule: 1), manufactured by Nippon Shokubai Co., Ltd. |
|  |  |  | L-A | lauryl acrylate | Light acrylate L-A (ethylenic double bond/molecule: 1), manufactured by Kyoeisha chemical Co., Ltd |
|  |  |  | ISTA | Isostearyl acrylate | ISTA (ethylenic double bond/molecule: 1), manufactured by Osaka Organic Chemical Industry Ltd. |
|  |  | Alicyclic hydrocarbon-based monofunctional monomer | V#155 | Cyclohexyl acrylate | Viscoat V#155 (ethylenic double bond/molecule: 1), manufactured by Osaka Organic Chemical Industry Ltd., |
|  |  |  | IBOA | Isobornyl acrylate | Sartomer SR506D (ethylenic double bond/molecule: 1), manufactured by Sartomer |
|  |  |  | 3,5,5TMCHA | 3,5,5-trimethylcyclohexyl acrylate | Sartomer CD420 (ethylenic double bond/molecule: 1), manufactured by Sartomer. |
|  |  |  | FA-511A | Dicyclopentenyl acrylate | FANCRYL FA-511A (ethylenic double bond/molecule: 1), manufactured by Hitachi Chemical Co., Ltd. |
|  |  |  | FA-512A | Dicyclopentenyl oxyethyl acrylate | FANCRYL FA-512A (ethylenic double bond/molecule: 1), manufactured by Hitachi Chemical Co., Ltd. |
|  |  |  | FA-513A | Dicyclopentanyl acrylate | FANCRYL FA-513A (ethylenic double bond/molecule: 1), manufactured by Hitachi Chemical Co., Ltd. |
|  |  | Other monofunctional monomer | EEEA | 2-(2-ethoxyethoxy)ethyl acrylate | Sartomer SR256 (ethylenic double bond/molecule: 1, manufactured by Sartomer |
|  |  |  | THFA | Tetrahydrofurfuryl acrylate (THF-A) | Sartomer SR285 (ethylenic double bond/molecule: 1, manufactured by Sartomer |
|  | Polyfunctional monomer | Bifunctional monomer | HDDA | Hexanediol diacrylate | Sartomer SR238F (ethylenic double bond/molecule: 2), manufactured by Sartomer |
|  |  | Trifunctional monomer | TMPTA | Trimethylolpropane triacrylate | Light acrylate TMPTA (ethylenic double bond/molecule: 3), manufactured by Kyoeisha chemical Co., Ltd. |
|  |  |  | PE-3A | Pentaerythritol triacrylate | Light acrylate PE-3A (ethylenic double bond/molecule: 3), manufactured by Kyoeisha chemical Co., Ltd. |
|  |  | Tetrafunctional monomer | PETA | Pentaerythritol tetraacrylate | Light acrylate PE-4A (ethylenic double bond/molecule: 4), manufactured by Kyoeisha chemical Co., Ltd. |
|  |  | Hexafunctional monomer | M-400 | Dipentaerythritol hexaacrylate | Aronix M-400(ethylenic double bond/molecule: 6), manufactured by TOAGOSEI CO., LTD. |
| Polymerization initiator | Acyl phosphine oxides |  | DAROCURE TPO | 2,4,6-trimethylbenzoyl-diphenyl-phosphine oxide | DAROCURE TPO (acyl phosphine oxides), manufactured by Ciba |
|  | α-amino alkylphenones |  | IRGACURE907 | 2-methyl-1-[4-(methyl-thio)phenyl]-2-morpholinopropane-1-one | IRGACURE907 (α-amino alkylphenones), manufactured by Ciba |
|  | Thioxanthone |  | Chivacure ITX | Isopropylthioxanthone | Chivacure ITX (thioxanthone), manufactured by Double Bond Chemicals |
|  | Acyl phosphine oxides |  | IRGACURE819 | Bis(2,4,6-trimethylbenzoyl)-phenylphosphine oxide | IRGACURE 819 (acyl phosphine oxides), manufactured by Ciba |
| Surface modifier |  |  | TEGORad2100 | Silicone acrylate having polydimethylsiloxane structure | TEGO-Rad2100, manufactured by Degussa |
|  |  |  | BYK-UV3500 | Polyether(polyoxyethylene/polyoxypropylene)modified | BYK-UV3500, manufactured by BYK-Chemie |

TABLE 1-continued

Table 1: Components of primer ink and image forming ink composition

| | Components | Kinds | Trade names and Specifications |
|---|---|---|---|
| Anti-gelling agent | IRGAUTAB UV-10 | polydimethylsiloxane having acrylic groups at both ends Bis(1-oxyl-2,2,6,6-tetra-methylpiperidin-4-yl)sebacate | IRGASTAB UV10 (hindered amine), manufactured by Ciba |

In Examples and Comparative examples, the following non-penetrable recording substrates were used as recording media.

Examples 1 to 14 and Comparative Examples 1 to 6

Glass: manufactured by Matsunami Glass Ind., Ltd.
Glass Epoxy: KEL-GEF, manufactured by Shin-Kobe Electric Machinery Co., Ltd.
Tile: SPKC-100/L01-J, manufactured by INAX Corporation Examples 15 to 30 and Comparative Examples 7 to 12

Acrylic Board: manufactured by Kuraray Trading Co., Ltd. (thickness: 1.0 mm)
Corona treated PP:
Kobe Poly-sheet Natural PP-N-AN (thickness 1.0 mm), manufactured by Shin-Kobe Electric Machinery Co., Ltd.
Corona treater: TEC-4AX manufactured by KASUGA DENKI Inc.
Corona treatment: OUT PUT: 5 SPED: 1.0 m/min.
Aluminum Board Aluminum board HA246T, manufactured by Hikari Co., Ltd.
<Preparation of Primer Ink>

Example 1

Each component was measured in according to the compositions given in Table 2, and the mixture was stirred with a magnetic stirrer for 30 minutes. After stirring, the mixture was suction filtered through a glass filter (manufactured by Kiriyama Glass) to prepare a primer ink for forming a primer layer.

Examples 2 to 30 and Comparative Examples 1 to 12

Each primer ink was prepared in the same manner as in Example 1 according to the compositions given in Table 2 (Examples 1 to 10), Table 3 (Examples 11 to 14 and Comparative examples 1 to 6), Table 4 (Examples 15 to 25) or Table 5 (Examples 26 to 30 and Comparative examples 7 to 12).

TABLE 2

Table 2: Compositions of primer inks

| Ink composition for forming a primer layer | | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Polymerizable compound, (meth)acrylates | Aromatic ring structure | PEA | (parts) | 40 | 35 | 35 | 35 | 35 | 30 | 40 | 40 | 40 | 40 |
| | | HPPA | (parts) | | | | | | | | | | |
| | Acyclic hydrocarbon-based | IOA | (parts) | | | | | | | | | | |
| | | 2-EHA | (parts) | 49.49 | 39.49 | 39.49 | 39.49 | 44.49 | 54.49 | 49.49 | 49.49 | 49.47 | 49.49 |
| | | L-A | (parts) | | | | | | | | | | |
| | | ISTA | (parts) | | | | | | | | | | |
| | Other monofunctional monomer | EEEA | (parts) | | 15 | | | | | | | | |
| | | THFA | (parts) | | | 15 | | | | | | | |
| | Bifunctional monomer | HDDA | (parts) | | | | 15 | | | | | | |
| | Trifunctional monomer | TMPTA | (parts) | | | | | | 10 | | | | |
| | Tetrafunctional monomer | PETA | (parts) | | | | | | 5 | | | | |
| Polymerization initiator | | DAROCURE TPO | (parts) | 10 | 10 | 10 | 10 | 10 | 10 | | | 10 | 10 |
| | | IRGACURE907 | (parts) | | | | | | | 9 | | | |
| | | Chivacure ITX | (parts) | | | | | | | 1 | | | |
| | | IRGACURE819 | (parts) | | | | | | | | 10 | | |
| Surface modifier | | TEGORad2100 | (parts) | 0.01 | 0.01 | 0.01 | 0.01 | 0.01 | 0.01 | 0.01 | 0.01 | 0.03 | 0.005 |
| Anti-gelling agent | | IRGAUTAB UV-10 | (parts) | 0.5 | 0.5 | 0.5 | 0.5 | 0.5 | 0.5 | 0.5 | 0.5 | 0.5 | 0.5 |
| Total | | | (parts) | 100.0 | 100.0 | 100.0 | 100.0 | 100.0 | 100.0 | 100.0 | 100.0 | 100.0 | 100.0 |

TABLE 3

Table 3: Compositions of primer inks

| Ink composition for forming a primer layer | | | | Example 11 | Example 12 | Example 13 | Example 14 | Comparative example 1 | Comparative example 2 |
|---|---|---|---|---|---|---|---|---|---|
| Polymerizable compound, (meth)acrylates | Aromatic ring structure | PEA | (parts) | | | | | | |
| | | HPPA | (parts) | 60 | 35 | 35 | 40.5 | 40 | |
| | Acyclic hydrocarbon-based | IOA | (parts) | | | | | | |
| | | 2-EHA | (parts) | 29.49 | | | 49.49 | | |
| | | L-A | (parts) | | 39.49 | | | | |
| | | ISTA | (parts) | | | 39.49 | | | 49.49 |
| | Other monofunctional monomer | EEEA | (parts) | | | | | | 20 |
| | | THFA | (parts) | | 15 | 15 | | 49.49 | 20 |
| | Bifunctional monomer | HDDA | (parts) | | | | | | |
| | Trifunctional monomer | TMPTA | (parts) | | | | | | |
| | Tetrafunctional monomer | PETA | (parts) | | | | | | |
| Polymerization initiator | | DAROCURE TPO | (parts) | 10 | 10 | 10 | 10 | 10 | 10 |
| | | IRGACURE907 | (parts) | | | | | | |
| | | Chivacure ITX | (parts) | | | | | | |
| | | IRGACURE819 | (parts) | | | | | | |
| Surface modifier | | TEGORad2100 | (parts) | 0.01 | 0.01 | 0.01 | 0.01 | 0.01 | 0.01 |
| Anti-gelling agent | | IRGAUTAB UV-10 | (parts) | 0.5 | 0.5 | 0.5 | 0 | 0.5 | 0.5 |
| Total | | | (parts) | 100.0 | 100.0 | 100.0 | 100.0 | 100.0 | 100.0 |

| Ink composition for forming a primer layer | | | | Comparative example 3 | Comparative example 4 | Comparative example 5 | Comparative example 6 |
|---|---|---|---|---|---|---|---|
| | Polymerizable compound, (meth)acrylates | Aromatic ring structure | PEA | (parts) | | | | |
| | | | HPPA | (parts) | 30 | 40 | 40 | 60 |
| | | Acyclic hydrocarbon-based | IOA | (parts) | | | | |
| | | | 2-EHA | (parts) | 39.49 | 49.45 | 49.5 | |
| | | | L-A | (parts) | | | | |
| | | | ISTA | (parts) | | | | 29.49 |
| | | Other monofunctional monomer | EEEA | (parts) | | | | |
| | | | THFA | (parts) | | | | |
| | | Bifunctional monomer | HDDA | (parts) | 20 | | | |
| | | Trifunctional monomer | TMPTA | (parts) | | | | |
| | | Tetrafunctional monomer | PETA | (parts) | | | | |
| | Polymerization initiator | | DAROCURE TPO | (parts) | 10 | 10 | 10 | 10 |
| | | | IRGACURE907 | (parts) | | | | |
| | | | Chivacure ITX | (parts) | | | | |
| | | | IRGACURE819 | (parts) | | | | |
| | Surface modifier | | TEGORad2100 | (parts) | 0.01 | 0.05 | 0.001 | 0.01 |
| | Anti-gelling agent | | IRGAUTAB UV-10 | (parts) | 0.5 | 0.5 | 0.5 | 0.5 |
| | Total | | | (parts) | 100.0 | 100.0 | 100.0 | 100.0 |

TABLE 4

Table 4: Compositions of primer inks

| Ink composition for forming a primer layer | | | | Example 15 | Example 16 | Example 17 | Example 18 | Example 19 | Example 20 |
|---|---|---|---|---|---|---|---|---|---|
| Polymerizable compound, (meth)acrylates | Aromatic ring structure | PEA | (parts) | | 43.5 | | | | |
| | | HPPA | (parts) | 35 | 30 | 20 | 35 | 35 | 35 |
| | Alicyclic hydrocarbon-based | V#155 | (parts) | | 15.99 | 9 | 4 | | 5 |
| | | IBOA | (parts) | 44.5 | | 44.5 | 34.5 | 44.5 | 44.5 |
| | | 3,5,5TMCHA | (parts) | | | | | | |
| | | FA-511A | (parts) | | | | | | |
| | | FA-512A | (parts) | | | | | | |
| | | FA-513A | (parts) | | | | | | |
| | Other monofunctional monomer | IOA | (parts) | | | | | | |
| | | 2-EHA | (parts) | 9.99 | | | | | |
| | | THFA | (parts) | | | 15.99 | | | |
| | Bifunctional monomer | HDDA | (parts) | | | | 15.99 | | |
| | Trifunctional monomer | PE-3A | (parts) | | | | | 9.99 | |

TABLE 4-continued

Table 4: Compositions of primer inks

| | | | | | | | | | |
|---|---|---|---|---|---|---|---|---|---|
| | Hexafunctional monomer | M-400 | (parts) | | | | | | 4.99 |
| Polymerization initiator | | DAROCURE TPO | (parts) | 10 | 10 | 10 | 10 | 10 | 10 |
| | | IRGACURE907 | (parts) | | | | | | |
| | | Chivacure ITX | (parts) | | | | | | |
| | | IRGACURE819 | (parts) | | | | | | |
| Surface modifier | | TEGORad2100 | (parts) | 0.01 | 0.01 | 0.01 | 0.01 | 0.01 | 0.01 |
| Anti-gelling agent | | IRGAUTAB UV-10 | (parts) | 0.5 | 0.5 | 0.5 | 0.5 | 0.5 | 0.5 |
| Total | | | (parts) | 100.0 | 100.0 | 100.0 | 100.0 | 100.0 | 100.0 |

| Ink composition for forming a primer layer | | | | Example 21 | Example 22 | Example 23 | Example 24 | Example 25 |
|---|---|---|---|---|---|---|---|---|
| Polymerizable compound, (meth)acrylates | Aromatic ring structure | PEA | (parts) | | | | | |
| | | HPPA | (parts) | 35 | 35 | 35 | 35 | 35 |
| | Alicyclic hydrocarbon-based | V#155 | (parts) | | | | | |
| | | IBOA | (parts) | 44.5 | 44.5 | | | |
| | | 3,5,5TMCHA | (parts) | | | 44.5 | | |
| | | FA-511A | (parts) | | | | 44.5 | |
| | | FA-512A | (parts) | | | | | 44.5 |
| | | FA-513A | (parts) | | | | | |
| | Other monofunctional monomer | IOA | (parts) | | | | | |
| | | 2-EHA | (parts) | 9.99 | 9.99 | 9.99 | 9.99 | 9.99 |
| | | THFA | (parts) | | | | | |
| | Bifunctional monomer | HDDA | (parts) | | | | | |
| | Trifunctional monomer | PE-3A | (parts) | | | | | |
| | Hexafunctional monomer | M-400 | (parts) | | | | | |
| Polymerization initiator | | DAROCURE TPO | (parts) | | | 10 | 10 | 10 |
| | | IRGACURE907 | (parts) | 9 | | | | |
| | | Chivacure ITX | (parts) | 1 | | | | |
| | | IRGACURE819 | (parts) | | 10 | | | |
| Surface modifier | | TEGORad2100 | (parts) | 0.01 | 0.01 | 0.01 | 0.01 | 0.01 |
| Anti-gelling agent | | IRGAUTAB UV-10 | (parts) | 0.5 | 0.5 | 0.5 | 0.5 | 0.5 |
| Total | | | (parts) | 100.0 | 100.0 | 100.0 | 100.0 | 100.0 |

TABLE 5

Table 5: Compositions of primer inks

| Ink composition for forming a primer layer | | | | Example 26 | Example 27 | Example 28 | Example 29 | Example 30 | Comparative example 7 |
|---|---|---|---|---|---|---|---|---|---|
| Polymerizable compound, (meth)acrylates | Aromatic ring structure | PEA | (parts) | | | | | | 43.5 |
| | | HPPA | (parts) | 35 | 35 | 35 | 50 | 35 | 30 |
| | Alicyclic hydrocarbon based | V#155 | (parts) | | | | | | |
| | | IBOA | (parts) | | 44.5 | 44.5 | 25 | 45 | |
| | | 3,5,5TMCHA | (parts) | | | | | | |
| | | FA-511A | (parts) | | | | | | |
| | | FA-512A | (parts) | | | | 10 | | |
| | | FA-513A | (parts) | 44.5 | | | | | |
| | Other monofunctional monomer | IOA | (parts) | | | | | | |
| | | 2-EHA | (parts) | 9.99 | 9.97 | 9.99 | 4.49 | 9.99 | |
| | | THFA | (parts) | | | | | | 15.99 |
| | Bifunctional monomer | HDDA | (parts) | | | | | | |
| | Trifunctional monomer | PE-3A | (parts) | | | | | | |
| | Hexafunctional monomer | M-400 | (parts) | | | | | | |
| Polymerization initiator | | DAROCURE TPO | (parts) | 10 | 10 | 10 | 10 | 10 | 10 |
| | | IRGAGURE907 | (parts) | | | | | | |
| | | Chivacure ITX | (parts) | | | | | | |
| | | IRGACURE819 | (parts) | | | | | | |
| Surface modifier | | TEGORad2100 | (parts) | 0.01 | 0.03 | 0.005 | 0.01 | 0.01 | 0.01 |
| Anti-gelling agent | | IRGAUTAB UV-10 | (parts) | 0.5 | 0.5 | 0.5 | 0.5 | 0 | 0.5 |
| Total | | | (parts) | 100.0 | 100.0 | 100.0 | 100.0 | 100.0 | 100.0 |

TABLE 5-continued

Table 5: Compositions of primer inks

| Ink composition for forming a primer layer | | | | Comparative example 8 | Comparative example 9 | Comparative example 10 | Comparative example 11 | Comparative example 12 |
|---|---|---|---|---|---|---|---|---|
| Polymerizable compound, (meth)acrylates | Aromatic ring structure | PEA | (parts) | | | | | |
| | | HPPA | (parts) | | 35 | 35 | 35 | 40 |
| | Alicyclic hydrocarbon based | V#155 | (parts) | 30 | | | | |
| | | IBOA | (parts) | 43.5 | 34.5 | 44.5 | 44.5 | |
| | | 3.5.5TMCHA | (parts) | | | | | |
| | | FA-511A | (parts) | | | | | |
| | | FA-512A | (parts) | | | | | |
| | | FA-513A | (parts) | | | | | 49.49 |
| | Other monofunctional monomer | IOA | (parts) | 15.99 | | | | |
| | | 2-EHA | (parts) | | | 9.95 | 10 | |
| | | THFA | (parts) | | | | | |
| | Bifunctional monomer | HDDA | (parts) | | 19.99 | | | |
| | Trifunctional monomer | PE-3A | (parts) | | | | | |
| | Hexafunctional monomer | M-400 | (parts) | | | | | |
| Polymerization initiator | | DAROCURE TPO | (parts) | 10 | 10 | 10 | 10 | 10 |
| | | IRGAGURE907 | (parts) | | | | | |
| | | Chivacure ITX | (parts) | | | | | |
| | | IRGACURE819 | (parts) | | | | | |
| Surface modifier | | TEGORad2100 | (parts) | 0.01 | 0.01 | 0.05 | 0.001 | 0.01 |
| Anti-gelling agent | | IRGAUTAB UV-10 | (parts) | 0.5 | 0.5 | 0.5 | 0.5 | 0.5 |
| Total | | | (parts) | 100.0 | 100.0 | 100.0 | 100.0 | 100 |

As to the primer inks prepared in the Examples and Comparative examples, the viscosity and surface tension were measured as follows.

<Viscosity>

The viscosity was measured at 25° C., using an R100-type viscometer (manufactured by Toki Sangyo Co., Ltd.) under the condition of a rotation number of a cone of 10 rpm.

<Surface Tension>

The surface tension was measured at 25° C., using a fully automatic balance-type electro surface tension meter ESB-V (manufactured by Kyowa Kagaku).

<Preparation of Image Forming Ink Composition>

A colorant, a dispersant and polymerizable compounds (IOA and HDDA) were measured into a plastic bottle in the amounts given in Table 6 (P-1 to P-5) or Table 7 (P-6 to P-10). 100 parts of zirconia beads (0.1 mm) were added thereto, and the mixture was dispersed by a paint conditioner (manufactured by Toyo Seiki Ltd.) for 2 hours to obtain a primary dispersion. Then, the remaining components were added to the obtained primary dispersion in the amounts given in Table 6 or 7, after that the mixture was stirred with a magnetic stirrer for 30 minutes. After stirring, the mixture was suction filtered through a glass filter (manufactured by Kiriyama Glass) to prepare an image forming ink composition.

The obtained ink compositions had a viscosity of 21.3 mPa·s to 22.8 mPa·s, and a surface tension of 25.5 mN/m to 31.4 mN/m. The viscosity and surface tension were measured by the same manner as mentioned above.

TABLE 6

Table 6: Compositions of image forming ink compositions

| Ink composition for forming an image | | | | P-1 | P-2 | P-3 | P-4 | P-5 |
|---|---|---|---|---|---|---|---|---|
| Colorant | | MA-8 | (parts) | 2 | — | — | — | — |
| | | Yellow G01 | (parts) | — | 2 | — | — | — |
| | | RT355D | (parts) | — | — | 4 | — | — |
| | | P-BFS | (parts) | — | — | — | 2 | — |
| | | JR-806 | (parts) | — | — | — | — | 10 |
| Dispersant | | Sol. 33000 | (parts) | 1.6 | 1.6 | 3.2 | 1.6 | 2.0 |
| Polymerizable compound, (meth)acrylates | Monofunctional | THFA | (parts) | 20 | 20 | 16.4 | 20 | 13 |
| | Monofunctional | IOA | (parts) | 10 | 10 | 10 | 10 | 10 |
| | Bifunctional | HDDA | (parts) | 30 | 30 | 25 | 30 | 25 |
| | Hexafunctional | M-400 | (parts) | 5 | 5 | | 5 | |
| | Trifunctional | TMPTA | (parts) | 20 | 20 | 30 | 20 | 30 |
| Polymerization initiator | | DAROCURE TPO | (parts) | | 8.99 | 8.99 | 8.99 | 9.99 |
| | | IRGACURE907 | (parts) | 8.99 | | | | |
| | | CHIVACURE ITX | (parts) | 2.4 | 2.4 | 2.4 | 2.4 | — |
| Surface modifier | | BYK-UV3500 | (parts) | 0.01 | 0.01 | 0.01 | 0.01 | 0.01 |
| Total | | | (parts) | 100.0 | 100.0 | 100.0 | 100.0 | 100.0 |
| Viscosity (mPa·s) | | | | 21.4 | 21.6 | 21.3 | 22.0 | 22.8 |
| Surface tension (mN/m) | | | | 28.6 | 28.7 | 31.4 | 28.4 | 25.5 |

TABLE 7

Table 7: Compositions of image forming ink compositions

| Ink composition for forming an image | | | | P-6 | P-7 | P-8 | P-9 | P-10 |
|---|---|---|---|---|---|---|---|---|
| Colorant | | MA-8 | (parts) | 2 | — | — | — | — |
| | | Yellow G01 | (parts) | — | 2 | — | — | — |
| | | RT355D | (parts) | — | — | 4 | — | — |
| | | P-BFS | (parts) | — | — | — | 2 | — |
| | | JR-806 | (parts) | — | — | — | — | 10 |
| Dispersant | | Sol. 33000 | (parts) | 1.6 | 1.6 | 3.2 | 1.6 | 2.0 |
| Polymerizable compound, (meth)acrylates | Monofunctional | THFA | (parts) | 20 | 20 | 16.4 | 20 | 13 |
| | Monofunctional | IOA | (parts) | 10 | 10 | 10 | 10 | 10 |
| | Bifunctional | HDDA | (parts) | 30 | 30 | 25 | 30 | 25 |
| | Hexafunctional | M-400 | (parts) | 5 | 5 | | 5 | |
| | Trifunctional | PE-3A | (parts) | 20 | 20 | 30 | 20 | 30 |
| Polymerization initiator | | DAROCURE TPO | (parts) | | 8.99 | 8.99 | 8.99 | 9.99 |
| | | IRGACURE907 | (parts) | 8.99 | | | | |
| | | CHIVACURE ITX | (parts) | 2.4 | 2.4 | 2.4 | 2.4 | — |
| Surface modifier | | BYK-UV3500 | (parts) | 0.01 | 0.01 | 0.01 | 0.01 | 0.01 |
| Total | | | (parts) | 100.00 | 100.00 | 100.00 | 100.00 | 100.00 |
| Viscosity (mPa·s) | | | | 21.4 | 21.6 | 21.3 | 22.0 | 22.8 |
| Surface tension (mN/m) | | | | 28.6 | 28.7 | 31.4 | 28.4 | 25.5 |

<Formation of Image>

According to the following procedures, a printed product was prepared by applying the primer ink onto each recording media, and then applying the ink thereto to form an image.

(1) Using an ink-jet recording apparatus equipped with piezo-type ink-jet nozzles, a solid printing of each primer ink was prepared on the specified medium to form a printed film having a thickness of 5 μm. This ink-jet recording apparatus is provided with ink tanks, supply pipes, front chamber ink tanks right before head and piezo heads as an ink supply system. The ink-jet recording apparatus was driven at a driving frequency of 10 KHz so that the ink can be injected at a liquid droplet size of about 7 pl, and a resolution of 600×600 dpi.

(2) The ink was cured by irradiating the printed film with an ultraviolet ray at a total irradiation dose of 300 mJ/cm$^2$, using ultraviolet ray LED ("NLBU21W01-E2" manufactured by Nichia Corporation) as an irradiation means.

(3) Using an ink-jet recording apparatus equipped with piezo-type ink-jet nozzles, a solid printing of each image forming ink composition was prepared on the obtained primer layer to form a printed film having a thickness of 5 μm. This ink-jet recording apparatus is provided with ink tanks, supply pipes, front chamber ink tanks right before head and piezo heads as an ink supply system. The ink-jet recording apparatus was driven at a driving frequency of 10 KHz so that the ink can be injected at a liquid droplet size of about 7 pl, and a resolution of 600×600 dpi.

(4) The ink was cured by irradiating the printed film with an ultraviolet ray at a total irradiation dose of 300 mJ/cm$^2$, using ultraviolet ray LED ("NLBU21W01-E2" manufactured by Nichia Corporation) as an irradiation means.

After forming a primer layer with the respective primer ink of Examples 1 to 14 and Comparative examples 1 to 6, an image was formed with the respective image forming ink composition of P-1 to P-5 to obtain a printed product. In addition, after forming a primer layer with the respective primer ink of Examples 15 to 30 and Comparative examples 7 to 12, an image was formed with the respective image forming ink composition of P-6 to P-10 to obtain a printed product.

As to the prepared printed products, their properties were evaluated by the following methods. The results are shown in Table 8 and Table 9. The results of each case of using P-1 or P-6 which showed the most significant difference in the properties among all of image forming ink compositions are shown as the representative, although a printed product was prepared respectively for each ink composition listed in Table 6 and Table 7.

<Adhesion>

The adhesion was evaluated by "a cross hatch peeling test with Cellotape®" according to JIS K5600-5-6. The criteria of the evaluation were as follows.

◯: The number of peeled pieces was 10 or less
Δ: The number of peeled pieces was 11 to 20
x: The number of peeled pieces was 21 or more <Evaluation of Image Quality>

The prepared image was visually observed. When no ink repellency, blurring and color unevenness were observed, the image was evaluated as "◯". When at least one of them was observed, the image was evaluated as "x".

TABLE 8

Table 8: Performance evaluation of primer ink

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Ink viscosity | mPa·s | 11 | 10 | 10 | 13 | 15 | 15 | 11 | 10 | 11 | 11 |
| Surface tension | mN/m | 28 | 28 | 28 | 28 | 28 | 28 | 28 | 28 | 28 | 28 |
| Adhesion | Glass board | ◯ | ◯ | ◯ | ◯ | ◯ | ◯ | ◯ | ◯ | ◯ | ◯ |
| | Glass epoxy | ◯ | ◯ | Δ | ◯ | Δ | Δ | ◯ | ◯ | Δ | ◯ |
| | Tile | ◯ | ◯ | ◯ | x | x | x | ◯ | ◯ | ◯ | ◯ |
| Image quality | | ◯ | ◯ | ◯ | ◯ | ◯ | ◯ | ◯ | ◯ | ◯ | ◯ |

TABLE 8-continued

Table 8: Performance evaluation of primer ink

|  |  | Example 11 | Example 12 | Example 13 | Example 14 | Comparative example 1 | Comparative example 2 |
|---|---|---|---|---|---|---|---|
| Ink viscosity | mPa · s | 48 | 16 | 20 | 20 | 12 | 15 |
| Surface tension | mN/m | 28 | 28 | 28 | 28 | 28 | 28 |
| Adhesion | Glass board | ○ | ○ | ○ | ○ | x | x |
|  | Glass epoxy | ○ | ○ | ○ | ○ | x | x |
|  | Tile | ○ | ○ | ○ | ○ | x | x |
| Image quality |  | ○ | ○ | ○ | ○ | ○ | ○ |

|  |  | Comparative example 3 | Comparative example 4 | Comparative example 5 | Comparative example 6 |
|---|---|---|---|---|---|
| Ink viscosity | mPa · s | 14 | 11 | 11 | 62 |
| Surface tension | mN/m | 28 | 23 | 33 | 28 |
| Adhesion | Glass board | x | ○ | ○ | — |
|  | Glass epoxy | x | ○ | ○ | — |
|  | Tile | x | ○ | ○ | — |
| Image quality |  | ○ | x | x | — |

TABLE 9

Table 9: Performance evaluation of primer ink

|  |  | Example 15 | Example 16 | Example 17 | Example 18 | Example 19 | Example 20 |
|---|---|---|---|---|---|---|---|
| Ink viscosity | mPa · s | 20 | 21 | 20 | 20 | 23 | 24 |
| Surface tension | mN/m | 28 | 28 | 28 | 28 | 28 | 28 |
| Adhesion | Acrylic board | ○ | ○ | ○ | ○ | ○ | ○ |
|  | Corona treated PP | ○ | ○ | Δ | Δ | Δ | x |
|  | Aluminum board | ○ | ○ | ○ | x | x | Δ |
| Image quality |  | ○ | ○ | ○ | ○ | ○ | ○ |

|  |  | Example 21 | Example 22 | Example 23 | Example 24 | Example 25 |
|---|---|---|---|---|---|---|
| Ink viscosity | mPa · s | 20 | 20 | 10 | 30 | 38 |
| Surface tension | mN/m | 28 | 28 | 28 | 28 | 28 |
| Adhesion | Acrylic board | ○ | ○ | ○ | ○ | ○ |
|  | Corona treated PP | ○ | ○ | Δ | ○ | Δ |
|  | Aluminum board | ○ | ○ | ○ | ○ | Δ |
| Image quality |  | ○ | ○ | ○ | ○ | ○ |

|  |  | Example 26 | Example 27 | Example 28 | Example 29 | Example 30 | Comparative example 7 | Comparative example 8 |
|---|---|---|---|---|---|---|---|---|
| Ink viscosity | mPa · s | 35 | 20 | 20 | 48 | 20 | 22 | 14 |
| Surface tension | mN/m | 28 | 25 | 31 | 28 | 28 | 28 | 28 |
| Adhesion | Acrylic board | ○ | ○ | ○ | ○ | ○ | x | x |
|  | Corona treated PP | ○ | ○ | Δ | ○ | ○ | x | x |
|  | Aluminum board | ○ | ○ | ○ | ○ | ○ | x | x |
| Image quality |  | ○ | ○ | ○ | ○ | ○ | ○ | ○ |

|  |  | Comparative example 9 | Comparative example 10 | Comparative example 11 | Comparative example 12 |
|---|---|---|---|---|---|
| Ink viscosity | mPa · s | 25 | 20 | 20 | 61 |
| Surface tension | mN/m | 28 | 23 | 33 | 28 |
| Adhesion | Acrylic board | x | ○ | — | — |

TABLE 9-continued

| Table 9: Performance evaluation of primer ink | | | | | |
|---|---|---|---|---|---|
| | Corona treated PP | x | ○ | ○ | — |
| | Aluminum board | x | ○ | ○ | — |
| Image quality | | ○ | x | x | — |

Evaluation of Examples 1 to 14 and Comparative Examples 1 to 6

As shown in Table 8, it was proved that the printed product using the primer ink according to the present invention can improve fixation properties of an image and achieve a high-quality image on the non-absorbable recording media. The image quality of the images prepared by using each primer ink of Comparative examples 1, 2 or 3 was good, but a sufficient adhesion to the recording media could not be achieved. In the image prepared by using the primer ink of Comparative example 4, the surface tension was lower than that defined in the present invention, and ink repellency to the image forming ink occurred. The primer ink of Comparative example 5 could not be applied uniformly to the recording media since its surface tension was higher than that defined in the present invention, and hence, color unevenness of the image forming ink occurred. The primer ink of Comparative example 6 could not be applied to the recording media by the ink-jet system since the primer ink had a high viscosity. Thus, the evaluation on an image formed on the primer could not be done.

All of the primer inks were packed into aluminum pouches in which the inner sides were coated with polyethylene. When they were stored at 60° C. for 30 days, only the primer ink of Comparative example 14 was polymerized and solidified in the aluminum pouch. As to the other primer inks, the change ratios of the viscosity and the surface tension were within ±5% relative to the initial values. They had excellent storage stability.

When only an image forming ink was used without using the primer ink to form an image on the glass board, glass epoxy or tile, all of the obtained printed materials showed the results of "x" in the adhesion test.

Evaluation of Examples 15 to 30 and Comparative Examples 7 to 12

As shown in Table 9, it was proved that the printed product using the primer ink according to the present invention can improve fixation properties of an image and achieve a high-quality image on the non-absorbable recording media. The image quality of the images prepared by using each primer ink of Comparative examples 7, 8 or 9 was good, but a sufficient adhesion to the recording media could not be achieved. In the image prepared by using the primer ink of Comparative example 10, the surface tension was lower than that defined in the present invention, and ink repellency to the image forming ink occurred. The primer ink of Comparative example 11 could not be applied uniformly to the recording media since its surface tension was higher than that defined in the present invention, and hence, color unevenness of the image forming ink occurred. The primer ink of Comparative example 12 could not be applied to the recording media by the ink-jet system since the primer ink had a high viscosity. Thus, the evaluation on an image formed on the primer could not be done.

All of the primer inks were packed into aluminum pouches in which the inner sides were coated with polyethylene. When they were stored at 60° C. for 30 days, only the primer ink of Example 30 was polymerized and solidified in the aluminum pouch. As to the other primer inks, the change ratios of the viscosity and the surface tension were within ±5% relative to the initial values. They had excellent storage stability. They had excellent storage stability.

When only an image forming ink was used without using the primer ink to form an image on the acrylic board, corona treated PP or aluminum board, all of the obtained printed materials showed the results of "x" in the adhesion test.

The invention claimed is:

1. A primer ink comprising a polymerizable compound and a polymerization initiator, wherein the polymerizable compound consists of monofunctional monomers, and wherein the monofunctional monomers comprise a monofunctional monomer having an aromatic hydrocarbon-based ring structure in a molecule and an aliphatic hydrocarbon-based monofunctional monomer, wherein a total mass of the monofunctional monomer having an aromatic hydrocarbon-based ring structure in a molecule and the aliphatic hydrocarbon-based monofunctional monomer is 80% by mass or more based on the total mass of all polymerizable compounds which said primer ink comprises, wherein the primer ink has a surface tension of 25 mN/m to 31 mN/m and a viscosity of 50 mPa·s or less, and
wherein the monofunctional monomer having an aromatic hydrocarbon-based ring structure comprises 2-hydroxy-3-phenoxypropyl acrylate.

2. The primer ink according to claim 1, wherein the aliphatic hydrocarbon-based monofunctional monomer comprises a monofunctional monomer not having an alicyclic hydrocarbon structure in a molecule.

3. The primer ink according to claim 1, wherein the aliphatic hydrocarbon-based monofunctional monomer comprises a monofunctional monomer having an alicyclic hydrocarbon structure in a molecule.

4. The primer ink according to claim 1, further comprising an anti-gelling agent and a surface modifier.

5. The primer ink according to claim 1 for using as a primer for an image forming ink composition having a surface tension of 25 mN/m to 32 mN/m.

6. The primer ink according to claim 2, wherein the aliphatic hydrocarbon-based monofunctional monomer comprises a monofunctional monomer having an alicyclic hydrocarbon structure in a molecule.

7. The primer ink according to claim 2, further comprising an anti-gelling agent and a surface modifier.

8. The primer ink according to claim 3, further comprising an anti-gelling agent and a surface modifier.

9. The primer ink according to claim 2 for using as a primer for an image forming ink composition having a surface tension of 25 mN/m to 32 mN/m.

10. The primer ink according to claim 3 for using as a primer for an image forming ink composition having a surface tension of 25 mN/m to 32 mN/m.

11. The primer ink according to claim 4 for using as a primer for an image forming ink composition having a surface tension of 25 mN/m to 32 mN/m.

* * * * *